US011504627B2

(12) United States Patent
Oe et al.

(10) Patent No.: US 11,504,627 B2
(45) Date of Patent: Nov. 22, 2022

(54) GAME SYSTEM, SERVER SYSTEM, TERMINAL AND METHOD OF EXECUTING GAME THAT PROVIDES ADVANTAGEOUS EFFECT TO TEAM

(71) Applicant: BANDAI NAMCO Entertainment Inc., Tokyo (JP)

(72) Inventors: Ryoichi Oe, Tokyo (JP); Tetsuro Shimizu, Kawaguchi (JP); Yosuke Katsuki, Kawaguchi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 17/002,285

(22) Filed: Aug. 25, 2020

(65) Prior Publication Data

US 2021/0060438 A1 Mar. 4, 2021

(30) Foreign Application Priority Data

Aug. 28, 2019 (JP) .............................. JP2019-156210

(51) Int. Cl.
*A63F 13/69* (2014.01)
*A63F 13/35* (2014.01)
*A63F 13/822* (2014.01)

(52) U.S. Cl.
CPC .............. *A63F 13/69* (2014.09); *A63F 13/35* (2014.09); *A63F 13/822* (2014.09)

(58) Field of Classification Search
None
See application file for complete search history.

(56) References Cited

U.S. PATENT DOCUMENTS

| 2013/0337919 | A1* | 12/2013 | Kojo ..................... A63F 13/795 463/42 |
| 2014/0073416 | A1* | 3/2014 | Toyama ................ A63F 13/792 463/25 |
| 2015/0126269 | A1* | 5/2015 | Linden .................... A63F 13/30 463/31 |
| 2015/0273340 | A1* | 10/2015 | Cudak ..................... A63F 13/00 463/42 |
| 2019/0001225 | A1* | 1/2019 | Watanabe ............... A63F 13/48 |
| 2019/0070510 | A1 | 3/2019 | Kyono et al. |
| 2019/0111344 | A1 | 4/2019 | Hiroki et al. |

FOREIGN PATENT DOCUMENTS

| JP | 2019-042352 A | 3/2019 |
| JP | 2019-072076 A | 5/2019 |

OTHER PUBLICATIONS

Capture the flag, Wikipedia, https://en.wikipedia.org/wiki/Capture_the_flag, Aug. 16, 2018 (Year: 2018).*

* cited by examiner

*Primary Examiner* — Damon J Pierce
(74) *Attorney, Agent, or Firm* — Posz Law Group, PLC

(57) ABSTRACT

A server executes various controls for teams, each of which has at least one player, to have a matchup with each other, and manages each team, including change of a team during the game, record of each team, players and a number of players belonging to each team, and duration of a team. Further, the server determines, during the matchup game, whether a team item acquisition condition is satisfied based on the record of each player who belongs to the team and the like, and allows the team that satisfies the team item acquisition condition to acquire a team item which provides an advantageous effect in the game.

19 Claims, 9 Drawing Sheets

| AFFILIATION INFORMATION | ATTRIBUTE INFORMATION / LEVEL INFORMATION | RECORD RELATED INFORMATION / TOTAL RECORD INFORMATION | PLAYER CHARACTER INFORMATION | BASE INFORMATION | BENEFIT INFORMATION | BILLING INFORMATION | HISTORY INFORMATION |
|---|---|---|---|---|---|---|---|
| | | | | | | | |
| | | | | | | | |
| | | | | | | | |

FIG. 5A

| TEAM ID | PLAYER ID OF LEADER ETC. | NUMBER OF PLAYERS | TEAM LEVEL | PARAMETER | TEAM ITEM | CONTRIBUTION | DURATION | ACHIEVEMENT INFORMATION | RECORD INFORMATION |
|---|---|---|---|---|---|---|---|---|---|
| | | | | | | | | | |
| | | | | | | | | | |
| | | | | | | | | | |

FIG. 5B

GAME SYSTEM, SERVER SYSTEM, TERMINAL AND METHOD OF EXECUTING GAME THAT PROVIDES ADVANTAGEOUS EFFECT TO TEAM

Japanese Patent Application No. 2019-156210, filed on Aug. 28, 2019, is hereby incorporated by reference in its entirety.

BACKGROUND OF THE INVENTION

The present invention relates to a game system, a server, a terminal, a method of executing a game, and the like.

As information communication terminals, such as tablet type terminals and smartphones, and personal computers (hereafter "communication terminals") become popular with increasing and improving functions in recent years, opportunities to execute games on these communication terminals are increasing.

Further, online games called "social games", which integrate a communication type networking service called "social networking server" (hereafter referred to as "SNS") and games, have been provided.

Each user executes such games as an action game, a battle game and RPG with another user via a portable information communication terminals, such as a smartphone.

Particularly in recent years, it is known to add an effect to such games to advance a game advantageously over the other player when a predetermined condition, such as collecting a plurality of specific items (game items) during the game, is satisfied (e.g. JP-A-2019-042352).

In the case of JP-A-2019-042352, in order to acquire an advantageous effect, the player collects a plurality of specific items while competing with other players. However this system is not for each player of a team, constituted of a plurality of players, to advance the game individually to meet the conditions to acquire specific items, in cooperation as a team. Therefore, this system requires further improvement if this system is applied to a team match.

SUMMARY

The invention can provide a game system and the like which are capable of increasing the sense of unity among players belonging to a team, and improving the entertainment level in a game in terms of team competition over records in a matchup game or the like, exceeding the level of an individual match.

According to a first aspect of the invention, provided is a game system which executes a game into which one or more teams having at least one player entry and that controls a player character operated by the player, the game system including a processor programmed to:

execute control related to the game for each of the teams;

manage a game item which is acquired by each of the teams in the game and provides an advantageous effect in the game to a team which has acquired the game item, acquisition number of the game item being limited;

execute, for each of the teams, determining processing to determine whether a given first condition is satisfied during the game;

control acquirement of the game item for a team that is determined to satisfy the first condition in the determining processing; and provide the advantageous effect in the game to the team which has acquired the game item.

According to a second aspect of the invention, there is provided a server which causes a terminal that is connected via a network and is operated by a player, to execute a game into which one or more teams having at least one player entry and that controls a player character operated by the player, the server comprising a processor programmed to:

receive an operation instruction from the player;

execute control related to the game for each of the teams;

manage a game item which is acquired by each of the teams in the game and provides an advantageous effect in the game to a team which has acquired the game item, acquisition number of the game item being limited;

execute, for each of the teams, determining processing to determine whether a given first condition is satisfied during the game;

control acquirement of the game item for a team that is determined to satisfy the first condition in the determining processing;

provide an advantageous effect in the game to the team which has acquired the game item; and provide game control information on the game, including information related to the acquired game item and the advantageous effect, to the terminal.

According to a third aspect of the invention, there is provided a terminal which is connected to the server according to claim 15 via a network, the terminal comprising a processor programmed to:

receive an instruction from the player;

transmit the received instruction from the player to the server, and receive game information related to the game; and display an image related to the game on a display unit based on the received game information.

According to a fourth aspect of the invention, there is provided a game control method for executing a game into which one or more teams having at least one player entry and that controls a player character operated by the player, the game control method comprising:

executing control related to the game for each of the teams;

managing a game item which is acquired by each of the teams in the game and provides an advantageous effect in the game to a team which has acquired the game item, acquisition number of the game item being limited;

executing, for each of the teams, determining processing to determine whether a given first condition is satisfied during the game;

controlling acquirement of the game item for a team that is determined to satisfy the first condition in the determining processing; and providing the advantageous effect in the game to the team which has acquired the game item.

BRIEF DESCRIPTION OF THE SEVERAL VIEWS OF THE DRAWING

FIG. 5A and FIG. 5B are examples of player information and team information that are stored in a player information storage unit according to an embodiment of the invention;

Figure 1:
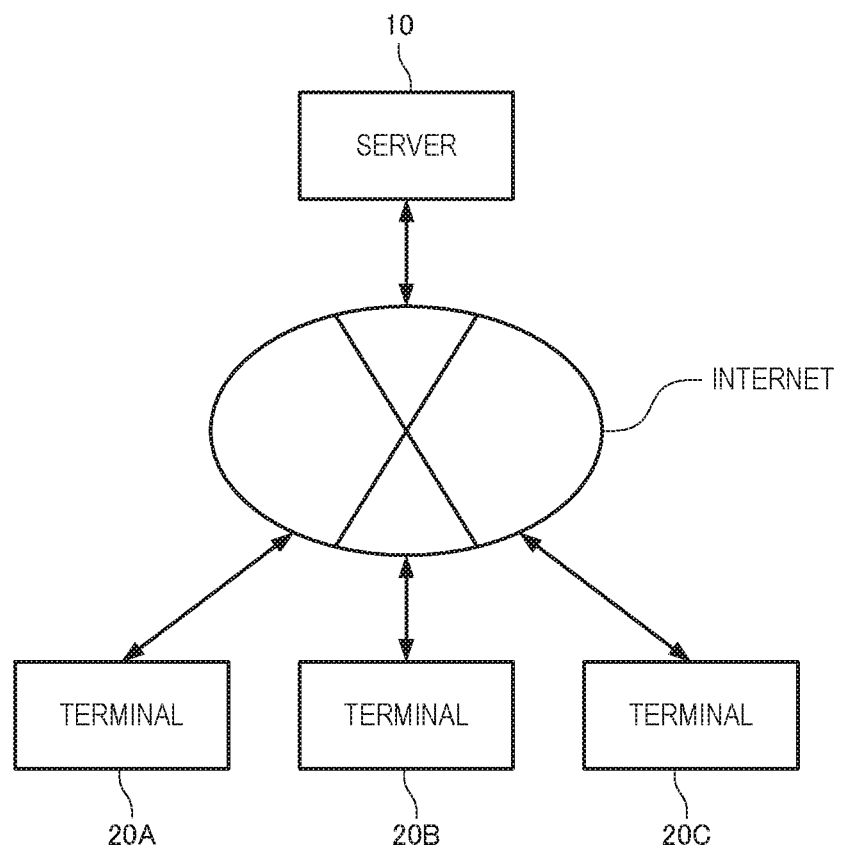
FIG. 1 is a diagram illustrating an example of a configuration of a game system according to an embodiment of the invention.

DETAILED DESCRIPTION OF THE EMBODIMENT (1) According to an embodiment of the invention, provided is a game system which executes a game into which one or more teams having at least one player entry and that controls a player character operated by the player, the game system comprising a processor programmed to:

execute control related to the game for each of the teams;

manage a game item which is acquired by each of the teams in the game and provides an advantageous effect in the game to a team which has acquired the game item, acquisition number of the game item being limited;

execute, for each of the teams, determining processing to determine whether a given first condition is satisfied during the game;

control acquirement of the game item for a team that is determined to satisfy the first condition in the determining processing; and provide the advantageous effect in the game to the team which has acquired the game item.

Since the game system described above is capable of providing the advantageous effect to an entire team if a specific game item is acquired by the cooperation of the players belonging to the team, the sense of unity of the players belonging to the team is increased, and the entertainment level in the game, in terms of team competition over records in a matchup game or the like, is improved, exceeding the level of an individual match.

In particular, according to the game system described above, competition among the teams to acquire a game item, which provides the advantageous effect in the game, can be heated by making a number of the game item to be acquired less than a number of teams participating in the game, hence the team match can be energized and the entertainment level of the game can be improved.

It should be noted that the "one or more teams having at least one player" means that even one player can form a team, but it is preferable that a team is constituted of a plurality of players, since a sense of unity among players can be experienced.

Moreover, the "execute control processing related to the game for each of the teams" means that control related to the game, such as a matchup game, an RPG, a racing game, a sports game, or the like is executed, for each of the teams each constituted of having at least one player (preferable a plurality of players), for example, and a case of executing control related to the game for each of the teams each having at least one player character for a player is not included.

In principle, the "acquisition number of the game item is limited" is preferably a game of which acquisition number is less than a number of teams, but the present embodiment is not limited to this, as long as a limitation is set.

Furthermore, the "given first condition" is a condition related to a growth of a team during the game, or a condition related to a growth of each player belonging to each team during the game, and "given first condition" is a condition related to a game element that changes as a team, when each player belonging to the team executes the game.

For example, the "given first condition" includes the following:

(A1) a number of players belonging to the team;

(A2) acquiring, as the whole team, an item (including game currency), an ability (including a number, type, quantity, or the like), or a characteristic (including a number, type, quantity, or the like), of a player character of each player belonging to the team;

(A3) parameter of the whole team related to the player or the player character, including an experience value, a score, a point, a physical power value, or the like;

(A4) a level of the team;

(A5) contribution that the player, belonging to the team, brought to the team (quantity and ratio of goods (e.g. item) and funds (e.g. game currency) that each player provides to the team);

(A6) duration since establishment of the team (duration period);

(A7) number and types of game stages and tasks as the whole team, cleared by players belonging to this team; and (A8) combination of at least two out of (A1) to (A7).

In addition, for example, the "game item" includes a player character and an item (including ability and characteristic) to be the operation targets or instruction targets of a player, and cards used for the game (game cards electronically provided), in which the player character and item are specified. The game item is preferably a game item which has an effect on the team or on all players belonging to the team.

Moreover, the "control acquirement of the game item" includes controlling acquiring a game item which does not yet belong to any team, and taking away a game item which has already been acquired by another team.

Furthermore, the "advantageous effect in the game" includes the following:

(B1) improving abilities of the team, each player belonging to the team, and each player character to be operated by each player (including an increase in a current ability value and addition of a new ability);

(B2) increasing parameter values, such as points, scores, game currency, experience value, or the like of the team or player belonging to the team; and (B3) increasing the winning probability based on a loot box, which the team or player belonging to the team executes.

(2) In the game system described above, the processor is programmed to, execute determining processing to determine a team to which each of the at least one player belongs, and changing processing to change the team of the player to which team has already been belonged.

According to the game system described above, the team, to which each player belongs to, can be determined randomly, in accordance with the game situation, or in accordance with the instruction by the player.

Therefore, according to the game system described above, even if the player already belongs to the team, the team can be changed randomly, in accordance with the game situation, or in according with the instruction by the player.

In particular, since the game system described above can determine or change the team in accordance with the instruction by the player, participation of more players can be anticipated as the entertainment level of the team increases by acquiring more game items that have an advantageous effect, making the game items accessible.

Thereby, according to the game system described above, the team can acquire more advantageous effects and can be managed in a positive cycle.

As a result, according to the game system described above, the sense of unity of the players belonging to a team can be increased, and the entertainment level of the game, in terms of team competition over records in a matchup game or the like, can be improved, exceeding the level of an individual match.

It should be noted that examples of the "determining processing" include processing for the player to form a new team.

(3) In the game system described above, the game item defines a leader character who functions as a leader in the game, and the processor is programmed to, as the advantageous effect in the game, change a parameter of the player, the parameter being related to an ability that is set for the leader character of the team, the parameter belonging to the team that acquires the leader character, or in which a player character of the player.

According to the game system described above, the world view of the game, such as a game-match played following a leader, can be realistically established, hence the sense of immersion experienced by the player can be improved, whereby the entertainment level of the game can be improved.

(4) In the game system described above, the processor is programmed to, when the game has a given game period and is for competing a record among the teams, manage record information which indicates the record of each of the teams.

According to the game system described above, the game system can be executed as a matchup game among the teams, the record of each team can be presented, and an index, to change the team in which the player participates based on the presentation of the record, can be provided to each player.

Therefore, the game system described above can activate/invigorate the mobility of the players and competition among the teams, whereby the entertainment level of the game can be improved.

It should be noted that examples of the "record information" include not only the record itself, such as the acquired score, points, experience value, acquired amount of game currency, a number and types of acquired items, records of other players or other player characters in the matchup (number of kills and number of defeats), and number and area of occupied bases (military bases and castles), but also scores, points and ranks calculated based on these records.

(5) In the game system described above, the processor is programmed to, execute the determining processing to determine whether a game element satisfies the first condition, the game element being related to growth of each of the teams during the game or growth of each of the at least one player belonging to each of the teams during the game.

According to the game system described above, since cooperation of each player who is a member of the team is promoted and the sense of unity increased, the team match can be energized, and the entertainment level of the game can be improved.

It should be noted that the "a game element related to the growth of each team during the game, or growth of each player who is a member of the team during the game" includes each element of (A1) to (A8) described above, and the growth in this case means an increase or improvement of the value of various elements.

Furthermore, the "determining processing" is for determining, for example, whether these game elements are a predetermined level or more, or a predetermined level or less, or whether these elements have been acquired.

(6) In the game system described above, the processor is programmed to:

manage the game items in each of which the first condition is specified; and execute the determining processing to determine whether the first condition specified in each of the game items is satisfied.

According to the game system described above, the first condition can be set in accordance with the effect provided by the game item, such as using a stricter first condition in the case of the game item which provides the more advantageous effect.

Therefore, the game system described above can increase playability by requiring a strategy to acquire the game item, and improve entertainment level of the game as a result.

(7) In the game system described above, the processor is programmed to, when the team which has acquired the game item holds the game item until an end point of the game, provide a given benefit to the team.

According to the game system described above, by allowing the teams to compete over a game item, each team requires a strategy to hold on to the game item, and focus on maintaining the game item as a team until the game is over.

Therefore, the game system described above can increase the playability, and as a result, improve the entertainment level of the game.

It should be noted that examples of the "given benefit" include the following:

(C1) providing an item which can be used in the game;

(C2) execution of a loot box;

(C3) acquiring bonus points or game currency; and (C4) prize, such as a medal and trophy (electronic prize).

(8) In the game system described above, the processor is programmed to:

manage an acquisition timing of the game item acquired for each of the teams; and when the advantageous effect in the game is provided to the team which has acquired the game item, change the advantageous effect in accordance with the acquisition timing of the game item.

According to the game system described above, the effect in the game can be changed depending on the timing of acquiring the game item, such as the advantageous effect in the game is higher as the timing is closer to the game end timing.

Therefore, according to the game system described above, a strategy to acquire the game item can be incorporated into the game, and as a result, playability can be increased, and the entertainment level of the game can be improved.

(9) In the game system described above,
team attribute information related to an attribute of each of the teams is stored in a storage, and
the processor is programmed to:
manage, individually for the game item, acquisition possibility information to indicate whether acquisition of the game item is possible based on each of the team attribute information; and
execute the acquirement of the game item for the team that is determined to satisfy the first condition in the determining processing, the game item including the acquisition possibility information that indicates that acquirement of the team attribute information of the team is possible.

According to the game system described above, since the game item that can be acquired is different depending on the attribute of the team, a strategy to acquire the game item can be incorporated into the game, and as a result, playability can be increased, and the entertainment level of the game can be improved.

It should be noted that examples of the "team attribute information" include information indicated by the following:
(D1) a number of the players, such as at most 5 (small scale team) and at least 50 (large scale team);
(D2) the type of the attribute in the case where all players belonging to a team have a same attribute, or in the case where at least the predetermined ratio (80%, for example) of the players belonging to the same team have the same attribute;
(D3) attribute which is set by a team, based on the selection instruction by a player; and
(D4) attribute which is determined by a specific item acquired by a team (an item which a specific player of the team acquired during the game, such as a flag, a sword, or the like).

(10) In the game system described above,
team attribute information related to an attribute of each of the teams is stored in a storage, and
the processor is programmed to
change the first condition in accordance with the attribute indicated by the team attribute information.

For example, the game system described above can request that the team level is at least 5 as the first condition, to a large scale team of which team attribute is having 50 or more players belonging to the team, and request that the team level is at least 2 as the first condition, to a small scale team of which team attribute is having 5 or less players belonging to the team.

Therefore, since the condition to acquire the game item can be changed in accordance with the team attribute, the game system described above can adjust a balance to acquire the game item based on the team attribute.

In particular, when the first condition is changed in accordance with the type of the game item and in accordance with the team attribute, the game system described above can set a game item that is easy or difficult to acquire in accordance with the team attribute.

Therefore, according to the game system described above, a strategy to acquire the game item can be incorporated into the game, and as a result, playability can be increased, and the entertainment level of the game can be improved.

(11) In the game system described above,
team attribute information related to an attribute of each of the teams is stored in a storage, and
the processor is programmed to,
when the advantageous effect in the game is provided to the team that has acquired the game item, provide the advantageous effect that changes in accordance with the team attribute information of the team, in the game.

For example, the game system described above can provide a more advantageous effect to a large scale team than to a small scale team, or can provide a more advantageous effect to a game item having an attribute the same as the team attribute than a same medium having an attribute not the same as the team attribute.

Therefore, according to the game system described above, a strategy to acquire the game item can be incorporated into the game, and as a result, playability can be increased, and the entertainment level of the game can be improved.

(12) In the game system described above,
the processor is programmed to,
when a first team that has already acquired the game item and a second team that is different from the first team execute the game having a matchup element, execute transfer control processing to transfer the game item owned by the first team to the second team in a case where the second team wins a matchup.

According to the game system described above, control for transferring the game item, such as allowing completing for the game item among the teams, can be executed, hence a strategy on the game item to be acquired and acquisition timing can be incorporated into the game.

In particular, when possession of the game item is restricted, such as restricting a number of possessions of the game items by the team, a strategy related to selection of a game item, whether the game item is acquired or discarded, can be incorporated into the game.

A "game having a matchup element" is a game involving a win or loss among the teams, and includes not only a direct battle game, but also a game to determine a win or loss in a game result, as in the case of a mini-game.

(13) In the game system described above,
the processor is programmed to;
execute determining processing to determine whether the player who has not yet acquired the game item satisfies a given second condition that is set to be more disadvantageous in the game than the first condition; and
provide a given benefit to the player when it is determined that the second condition is satisfied in the determining processing.

According to the game system described above, even the team which did not acquire the game item can acquire the benefit that provides an advantageous effect in the game if the second condition is satisfied.

Therefore, the game system described above can reverse the situation of the team holding the game item, so that even the team which did not acquire the game item can maintain the motivation to continue the game until the end.

It should be noted that an example of the "given second condition" is a condition of which advantage is less than the first condition, such as a condition of which game level is higher or a condition of which a number of players is more than the first condition.

Furthermore, examples of the "given benefit" includes the following:

(E1) providing an item that can be used in the game, such as a matchless item and a team item;
(E2) execution of a loot box; and
(E3) acquiring a bonus point or game currency.

It should be noted that this benefit is preferably a benefit that can reverse the situation of the team holding the team item, so that even a team which did not acquire the team item can maintain the motivation to continue the game until the end.

(14) In the game system described above,
the processor is programmed to:
provide rights to acquire game items to a plurality of teams that are determined that the first condition is satisfied in the determining processing; and
determine an order to acquire the game item among the plurality of teams having the rights to acquire the game item, in accordance with an attribute of each of the teams or a game element when each of the teams satisfies the first condition; and
execute the acquirement of the game item for the team that is determined to satisfy the first condition in the determining processing, based on the determined order to acquire the game item in accordance with a selection instruction of each of the teams.

According to the game system described above, the game item can be selected and acquired, for example, based on the intension of the team, in accordance with the sequence and timing when the first condition is satisfied, a number of the players on the team, or the like.

For example, according to the game system described above, the game item desired by the team can be acquired preferentially the earlier the sequence of satisfying the first condition, or the larger a number of the players on a team.

Therefore, according to the game system described above, the acquisition of this game item is influenced by the process to acquire the game item, hence the playability can be increased by incorporating a strategy to acquire the game item into the game, and as a result, the entertainment level of the game can be improved.

It should be noted that examples of the "game element" include: a sequence and timing of satisfying the first condition; and degree of difficulty and number of conditions in the case where the first condition is constituted by a plurality of conditions.

(15) According to an embodiment of the invention, provided is
a server which causes a terminal that is connected via a network and is operated by a player, to execute a game into which one or more teams having at least one player entry and that controls a player character operated by the player, the server comprising a processor programmed to:
receive an operation instruction from the player;
execute control related to the game for each of the teams;
manage a game item which is acquired by each of the teams in the game and provides an advantageous effect in the game to a team which has acquired the game item, acquisition number of the game item being limited;
execute, for each of the teams, determining processing to determine whether a given first condition is satisfied during the game;
control acquirement of the game item for a team that is determined to satisfy the first condition in the determining processing;
provide an advantageous effect in the game to the team which has acquired the game item; and provide game control information on the game, including information related to the acquired game item and the advantageous effect, to the terminal.

According to the server described above, when a specific game item, is acquired based on the cooperation of the players belonging to the team, an advantageous effect for the whole team can be provided, hence the sense of unity of the players belonging to the team can be increased, and the entertainment level in a game, in terms of team competition over records in a matchup game or the like, can be improved, exceeding the level of an individual match.

In particular, according to the server described above, competition among teams to get the game item, which provides an advantageous effect in the game, can be heated by making a number of the game items to be acquired to be less than a number of teams participating in the game, hence the team match can be energized, and the entertainment level of the game can be improved.

(16) According to an embodiment of the invention, provided is
a terminal which is connected to the server according to claim 15 via a network, the terminal comprising a processor programmed to:
receive an instruction from the player;
transmit the received instruction from the player to the server, and receive game information related to the game; and
display an image related to the game on a display unit based on the received game information.

According to the terminal, when a specific game item, such as an item, is acquired based on the cooperation of the players belonging to the team, an advantageous effect for the while team can be provided, hence the sense of unity of the players belonging to the team can be increased, and the entertainment level in the game, in terms of team competition over records in a matchup game or the like, can be improved, exceeding the level of an individual match.

In particular, according to the terminal described above, competition among teams to get a game item, which provides an advantageous effect in the game, can be heated by making a number of the game items to be acquired to be less than a number of the teams participating in the game, hence the team match can be energized, and the entertainment level of the game can be improved.

(17) According to an embodiment of the invention, provided is
a game control method for executing a game into which one or more teams having at least one player entry and that controls a player character operated by the player, the game control method comprising:
executing control related to the game for each of the teams;
managing a game item which is acquired by each of the teams in the game and provides an advantageous effect in the game to a team which has acquired the game item, acquisition number of the game item being limited;
executing, for each of the teams, determining processing to determine whether a given first condition is satisfied during the game;
controlling acquirement of the game item for a team that is determined to satisfy the first condition in the determining processing; and
providing the advantageous effect in the game to the team which has acquired the game item.

According to the game control method described above, when a specific game item is acquired based on the cooperation of the players belonging to the team, an advantageous effect for the whole team can be provided, hence the sense of unity of the players belonging to the team can be increased, and the entertainment level in the game, in terms of team competition over records in a matchup game or the like, can be improved, exceeding the level of an individual match.

In particular, according to the game control method described above, competition among teams to get the game item, which provides an advantageous effect in the game, can be heated by making a number of the game items to be acquired to be less than a number of teams participating in the game, hence the team match can be energized, and the entertainment level of the game can be improved.

Embodiments of the invention are described in detail below. It is noted that the following embodiments do not unduly limit the scope of the invention as stated in the claims. In addition, all of the components described in the following embodiments are not necessarily essential requirements of the invention.

1. Game System

First an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides game services and a terminal 20 (for example, terminals 20A, 20B, 20C) are configured to be connectable to the Internet (an example of a network).

By accessing the server 10 from the terminal 20, a player can acquire a game being transmitted from the server 10 via the Internet, and play the game. Furthermore, by accessing the server 10 from the terminal 20, the player can communicate with other players and execute the game.

The server 10 is an information processing apparatus capable of providing a service that enables players to play a game using the terminal 20 communicably connected to the server 10 via the Internet. In addition, the server 10 may function as an SNS server which is capable of providing a service for communication among a plurality of players (information processing apparatus which provides a communication-type service).

Furthermore, for example, when the server 10 functions as an SNS server, the server 10 is capable of providing a game referred to as a social game, which is executed using an operating environment (an application programming interface (API), a platform or the like) of the SNS to be provided.

In particular, the server 10 is capable of providing games provided via a web browser of the terminal 20, including browser games (games which start by simply opening an installation site with a web browser) created in various languages such as HTML, Flash, CGI, PHP, Shockwave, a Java (registered trademark) applet and JavaScript (registered trademark).

Unlike existing online games, social games do not require dedicated client software, and include games that can be played with only a web browser and an SNS account. In addition, the server 10 is configured to be capable of being connected to a terminal (a smartphone, a personal computer, a game device, or the like) of another player via a network, and providing an online game which enables a same game progress to be simultaneously shared online.

Meanwhile, the server 10 may be constituted by one (apparatus or processor) or a plurality of (apparatuses or processors).

In addition, information such as billing information and game information stored in a storage area (a storage 140 to be described later) of the server 10 may be stored in a database (a storage apparatus or a memory in a broad sense) connected via a network (an intranet or the Internet), or when the server functions as a SNS server, information such as a player information storage unit 146 in the storage area, may be stored in a database (a storage apparatus or a memory in a broad sense) connected via a network (an intranet or the Internet).

Specifically, the server 10 is configured to receive input information based on an operation by a player of the terminal 20 (in other words, a player executing a game), and to perform game processing based on the received input information.

In addition, the server 10 is configured to transmit a game processing result to the terminal 20. The terminal 20 is configured to perform various types of processing on the game processing result received from the server 10, so that the player can view the result on the terminal 20.

The terminal 20 is an information processing apparatus such as an image generating apparatus including a smartphone, a mobile phone, a PHS, a computer, a game apparatus, a PDA and a mobile game device, and is capable of being connected to the server 10 via a network, such as the Internet (a WAN) or a LAN. The connection between the terminal 20 and the server 10 may be either wired or wireless.

In addition, the terminal 20 is provided with a web browser capable of viewing web pages (data in HTML format). In other words, the terminal 20 is equipped with a communication control function for communicating with the server 10, and a web browser function for performing display control using data (Web data, data created in HTML format, and the like) received from the server 10, and transmitting data of a player' operation to the server 10.

For example, the terminal 20 may execute game processing based on a game application stored in the storage area (a storage 270 to be described later) while acquiring required information from the server 10, such as game information related to other players when a matchup game is performed with other players, and execute a variety of processing to provide the game screen to the player so that the player can execute the game.

Furthermore, for example, the terminal 20 may acquire game control information provided by the server 10 and execute a predetermined game processing, so as to execute the game based on the game processing, while transmitting data on player' operation to the server 10.

In particular, when the terminal 20 executes the game processing based on the game control information provided by the server 10, the terminal 20 makes a request to the server 10 to perform a predetermined game. Then the terminal 20 is connected to a game site of the server 10, and the game is started.

By using an API as necessary, the terminal 20 is configured to cause the server 10 functioning as an SNS server to perform predetermined processing, or to acquire the player information storage unit 146 managed by the server 10 functioning as an SNS server to execute a game.

2. Server

Figure 2:
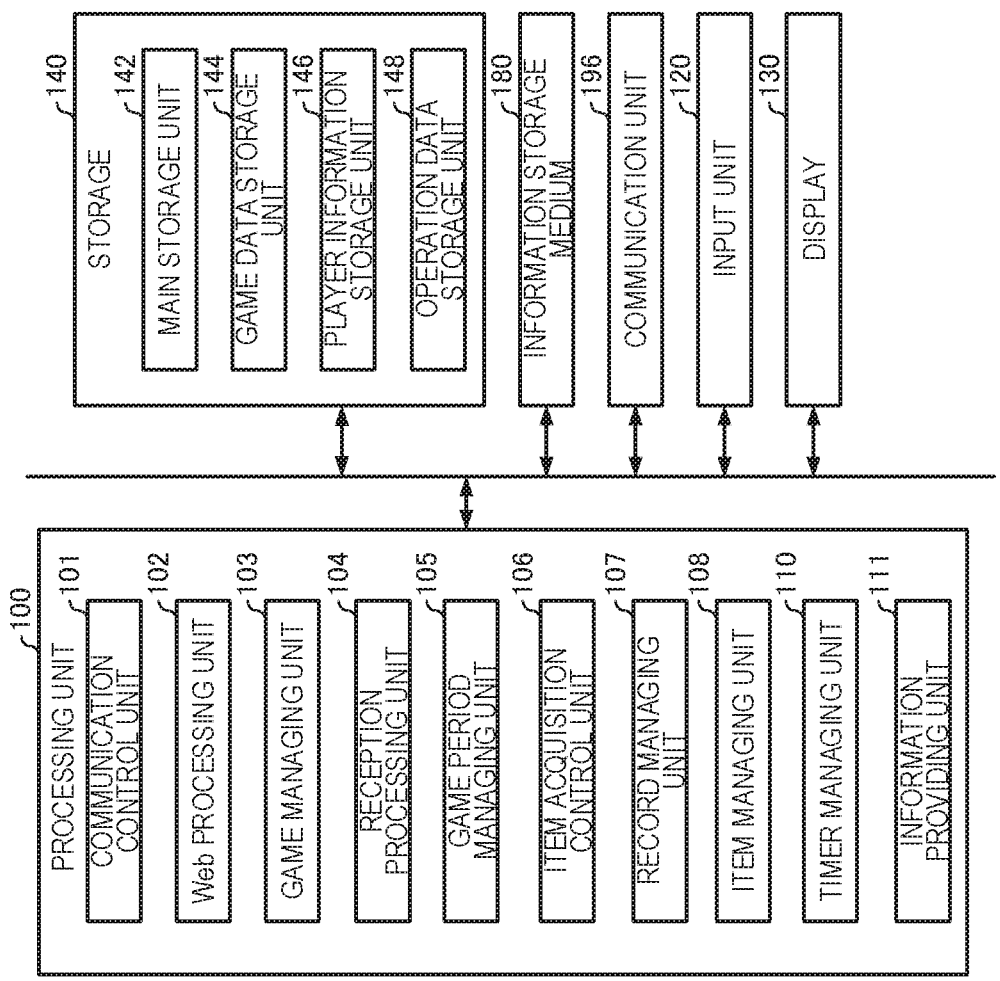
FIG. 2 is a diagram illustrating functional blocks of a server according to an embodiment of the invention.

Next the server 10 will be described with reference to FIG. 2. FIG. 2 is a diagram illustrating the functional blocks of the server 10. Alternatively, a part of the components (each unit) illustrated in FIG. 2 in the server 10 may be omitted.

The server 10 includes an input unit 120 used by a system administrator or the like for input, a display 130 which performs predetermined display, an information storage medium 180 storing predetermined information, a communication unit 196 for communication with the terminal 20 and the like, a processing unit 100 which executes processing mainly related to a game to be provided, and a storage 140 storing a variety of data mainly used in the game.

The input unit 120 is used by a system administrator or the like to input settings related to a game or other necessary settings, and to input data. For example, the input unit 120 is constituted by a mouse, a keyboard, or the like.

The display 130 is for displaying an operation screen for the system administrator. For example, the display 130 is constituted by a liquid crystal display or the like.

The information storage medium 180 (a computer-readable medium) stores a program, data, and the like, and a function of the information storage medium 180 is constituted by an optical disk (CD or DVD), a magneto-optical disk (MO), a magnetic disk, a hard disk, a magnetic tape, a memory (ROM), or the like.

The communication unit 196 performs various controls for communicating with the outside (for example, a terminal, another server, or another network system), and a function of the communication unit 196 is constituted by various processors, hardware such as a communication ASIC, a program, or the like.

The storage 140 serves as a work area for the processing unit 100, the communication unit 196, and the like, and a function of the storage 140 is constituted by a RAM (VRAM) or the like. Moreover, information stored in the storage 140 may be managed by a database.

Furthermore, in addition to a main storage unit 142, the storage 140 has:

(A1) a game data storage unit 144 which stores information related to a game (hereafter referred to as "game information"), including various table data used for executing the game processing, and information related to a game item (including an initial value), such as a game card provided to the player;

(A2) a player information storage unit 146 which stores, for each player, information related to a player (hereafter referred to as "player information"), and information related to a team to which each player belongs (hereafter referred to as "team information"); and (A3) an operation data storage unit 148 which stores, in the case of a simulation game, automatic operation data (automatic operation information) that is generated by game control processing related to simulation.

In particular, in the game data storage unit 144, information which is provided by a game card or the like, and is related to an item acquired by an applicable team (hereafter referred to as "team item"), is stored (hereafter referred to as "team item information").

The team item information specifies, for each item, a name, ID and number of items of a team item, a condition for each team to acquire the team item in the team item acquisition processing (hereafter referred to as "team item acquisition condition"), and effect information which indicates an advantageous effect in the game which is provided to each team when this team item is acquired.

Moreover, the team item information may include information specifying an attribute of a team (specifically a number of players of the team, a team level, and the like) which cannot be acquired even if the team item acquisition condition is satisfied (hereafter referred to as "acquired attribute availability information"), or may include attribute information which indicates an attribute of each team item (attribute which is preset in the game such as the fire attribute and the water attribute), and the effect information in one team item information may be specified for each team attribute.

The processing unit 100 performs a variety of processing using the main storage unit 142 inside the storage 140 as a work area. The functions of the processing unit 100 can be realized by hardware, such as various processors (a CPU, DSP, or the like) and an ASIC (a gate array or the like) or by programs.

The processing unit 100 performs various types of processing of the present embodiment based on the program (data) stored in the information storage medium 180. In other words, the information storage medium 180 stores a program that causes a computer to function as each unit (a program which causes a computer to execute the processing of each unit) of the present embodiment.

For example, a processing unit 100 (processor) performs, based on a program stored in the information storage medium 180, overall control of the server 10 as well as a variety of processing, including control of the delivery of data and the like between the respective units. Furthermore, the processing unit 100 performs processing for providing various services in response to a request from the terminal.

Specifically, the processing unit 100 at the least includes a communication control unit 101, a web processing unit 102, a game managing unit 103, a reception processing unit 104, a game period managing unit 105, an item acquisition control unit 106, a record managing unit 107, an item managing unit 108, a timer managing unit 110 and an information providing unit 111.

The communication control unit 101 performs processing for transmitting and receiving data to/from the terminal 20 via the network. In other words, the server 10 performs a variety of processing based on information received by the communication control unit 101 from the terminal 20 and the like.

In particular, in conjunction with the information providing unit 111, the communication control unit 101 performs processing for transmitting, based on a request from the terminal 20 of a player, a game screen and information related to the game to the terminal 20 of the player.

The web processing unit 102 functions as a web server. For example, the web processing unit 102 performs, through a communication protocol, such as hypertext transfer protocol (HTTP), processing for transmitting data in response to a request by a web browser 211 installed on the terminal 20, and processing for receiving data transmitted by the web browser 211 of the terminal 20.

Moreover, while a case where the server 10 is also provided with a function as an SNS server will be described as an example according to the present embodiment. The server 10 may be formed separately as a game server and as a server for SNS. In addition, the server 10 may perform a part of or all of the processing of a game according to the present embodiment, or the terminal 20 may perform a part of the processing of the game according to the present embodiment.

The game managing unit 103 executes game processing related to role playing games (RPG) and matchup games for each player in conjunction with the terminal 20 based on an operation by a player input via the terminal 20.

In particular, the game managing unit 103 executes various games for each player based on the instruction by the player or at each timing as the game progresses (before start of game or during game).

Specifically, the game managing unit 103 manages a team constituted of at least one player and executes control related to a given game for each of the teams, while executing control related to such a game as a matchup among players, which is executed using player characters.

Moreover, based on various parameters for games (hereafter also referred to as "game parameters") included in the user information, the game managing unit 103 generates automatic operation data by executing automatic operation related to control of each game, such as town building, matchup, or the like, and stores the automatic operation data in the operation data storage unit 148.

Furthermore, based on an instruction by the concerned player (in other words, a player to be a target of a simulation game), the game managing unit 103 provides the automatic operation data to the concerned terminal 20 via the information providing unit 111, or reproduces this automatic operation data and providing the reproduced image data to the concerned terminal 20 via the information providing unit 111.

The reception processing unit 104 receives information related to the game transmitted from each terminal 20 (including information related to operation input) as game information.

The game period managing unit 105 manages various types of game periods. In particular, in the present embodiment, the game period managing unit 105 manages a first game period started from a predetermined game start timing, a second game period from the end of the first game period to a predetermined game end timing, and an entire game period constituted by these two game periods (hereafter referred to as "season").

The item acquisition control unit 106 executes determination processing for each team to determine whether a team item acquisition condition is satisfied (hereafter referred to as "acquisition condition determining processing"), and control acquirement of the game item for team which is determined to satisfy the team item acquisition condition in the acquisition condition determining processing.

The record managing unit 107 manages total record information, which indicates the total record of each player in a matchup game, and team record information, which indicates records of each team in a matchup game, based on the first record related information generated by control related to a game in a first game field, and second record related information generated by control related to a game in a second game field.

The item managing unit 108 manages a team item which is a game item given to (acquired by) each team.

The timer managing unit 110 has a timer function, and is used in order to manage each period in the game, in conjunction with the game period managing unit 105, the terminal 20, or the like.

In particular, the timer managing unit 110 outputs the current time or the preset time to each unit based on a request from the game managing unit 103, the game period managing unit 105, or other units. In addition, the timer managing unit 110 is used to synchronize with each terminal 20.

The information providing unit 111 generates various types of game control information (including information related to performance) that enables the terminal 20 to process a game, and provides the concerned terminal 20 the generated game information.

3. Terminal

Figure 3:
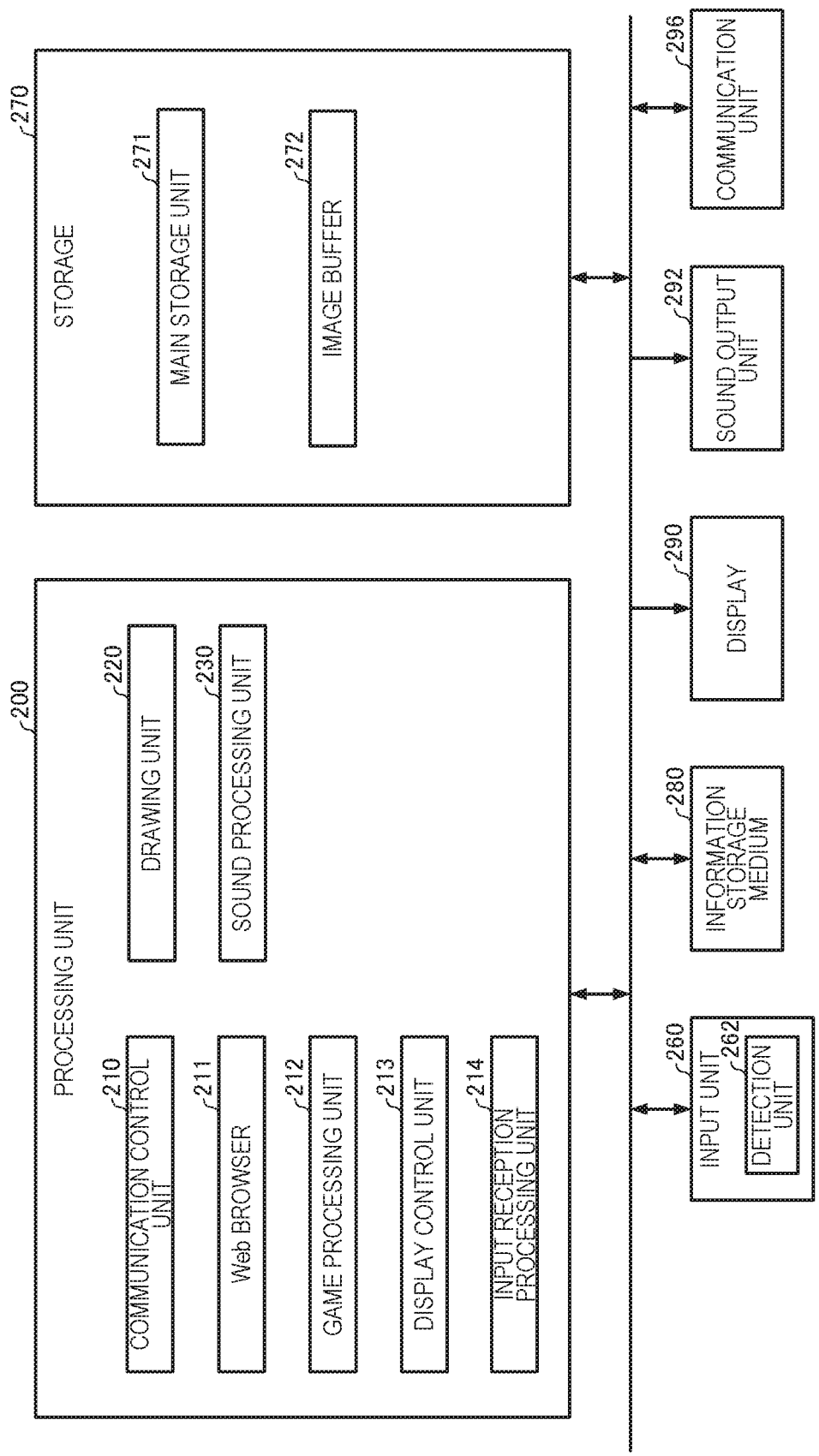
FIG. 3 is a diagram illustrating functional blocks of a terminal according to an embodiment of the invention.

Next the terminal 20 according to an embodiment of the invention will be described with reference to FIG. 3. FIG. 3 is a diagram illustrating the functional blocks of the terminal 20. Alternatively, a part of the components (each unit) illustrated in FIG. 2 in the terminal 20 may be omitted.

An input unit 260 is used to input the input information by a player, and outputs the input information by the player to a processing unit 200. The input unit 260 includes a detection unit 262 which detects input information (input signals) by the player. The input unit 260 is, for example, a lever, a button, a steering wheel, a microphone, a touch panel display, a keyboard, a mouse, and the like.

A storage 270 serves as a work area for the processing unit 200, a communication unit 296, and the like, and a function of the storage 270 can be realized by a RAM (VRAM) or the like. In addition, the storage 270 includes a main storage unit 271 to be used as a work area, and an image buffer 272 for storing a final display image and the like. Alternatively, the storage 270 may be configured such that a part of these components is omitted.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (ROM), or the like.

The processing unit 200 performs various types of processing of the present embodiment based on the program (data) stored in the information storage medium 280. The information storage medium 280 is capable of storing a program that causes a computer to function as each unit (a program which causes a computer to execute processing of each unit) of the present embodiment.

In the present embodiment, a program and game data, which are stored in the information storage medium 180 and the storage 140 of the server 10 for causing a computer to function as each unit of the present embodiment, are received via a network, and the received program and data are stored in the information storage medium 280. Alternatively, the program and data received from the server 10 may be stored in the storage 270 A case of causing the network system to function by receiving a program and data like this is also included in the scope of the invention.

A display 290 is for outputting an image generated by the present embodiment, and a function of the display 290 can be realized by a CRT, an LCD, a touch panel type display, a head-mounted display (HMD), or the like. A sound output unit 292 is for outputting sound generated in the present embodiment, and a function of the sound output unit 292 can be realized by a speaker, headphones, or the like.

A communication unit 296 is for performing various controls for communicating with the outside (for example, another terminal or server), and a function of the communication unit 296 can be realized by hardware, such as various processors, a communication ASIC, or the like, or by programs.

The processing unit 200 (processor) performs processing such as game processing, display control, image generating processing, and sound generating processing based on information related to a game acquired from the server 10 via the communication unit 296, input information from the input unit 260, a program, or the like.

This processing unit 200 performs various kinds of processing using the main storage unit 271 in the storage 270 as a work area. The functions of the processing unit 200 can be realized by hardware, such as various processors (a CPU, DSP, or the like), and an ASIC (a gate array or the like), or by programs.

The processing unit 200 includes a communication control unit 210, a web browser 211, a game processing unit 212, a display control unit 213, an input reception processing unit 214, a drawing unit 220, and a sound processing unit 230. Alternatively, a part of these components of the processing unit 200 may be omitted.

The communication control unit 210, for example, constitutes the communication control unit of the invention, and the display control unit 213, for example, constitutes the display control unit of the invention. Furthermore, the input reception processing unit 214, for example, constitutes the reception processing unit of the invention.

The communication control unit 210 performs processing to transmit data to or receive data from the server 10. The communication control unit 210 also performs processing to store data received from the server 10 to the storage 270 processing to analyze the received data, processing to control the transmission/reception of the other data, and the like.

Alternatively, the communication control unit 210 may perform processing to store address information of the server (IP address, port number) in the information storage medium 280, and to manage the address information. In this case, the communication control unit 210 may communicate with the server 10 in the case of receiving information to start communication inputted by the player.

In particular, the communication control unit 210 performs processing to transmit the identification information on the player and operation information to the server 10, and receive information related to the game (player information, game card information, web page of the player, game screen, and the like) from the server 10.

In addition, the communication control unit 210 may perform data transmission and reception with the server 10 at a predetermined cycle, or may perform data transmission and reception with the server 10 when input information is received from the input unit 260. In particular, the communication control unit 210 performs processing to receive a game screen from the server 10.

The web browser 211 is an application program to browse web pages (game screen), download an HTML file, an image file, or the like from the web server (server 10), and analyze the layout and control the display. The web browser 211 also transmits the data to the web server (server 10) using an input form (link, button, text box, or the like).

The web browser 211 can implement a browser game. For example, the web browser 211 may execute a program written in JavaScript (registered trademark), Flash, Java (registered trademark), or the like received from the web server (server 10).

The terminal 20 can display information from the web server specified by a URL via the Internet using the web browser 211. For example, the terminal 20 can display a game screen (such data as HTML) received from the server 10 using the web browser 211.

The game processing unit 212 performs various types of game operation processing. For example, the game processing unit 212 performs processing to start a game when a game start condition is satisfied, processing to progress a game, and processing to end a game when a game end condition is satisfied.

Furthermore, the game processing unit 212 may perform processing to arrange and set, in an object space, various objects (objects constituted by such primitives as a polygon, a free-curved surface, and a sub-division surface) which represent display items, such as a player character, a building, a baseball field, an automobile, a tree, a post, a wall, a map (topography), and the like.

In this case, an object space is a virtual space, and includes both a two-dimensional space and a three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition to setting the deck data of game cards, the game processing unit 212 executes game processing, including control of transmission and reception of a variety of information at login, execution of game processing based on the operation by the player in the case of executing a game in real-time in conjunction with the server 10, and reproduction of received automatic operation data in the case of executing a game based on automatic operation.

The display control unit 213 performs processing to display information on the display 290. For example, the display control unit 213 may display information using a web browser 211.

The input reception processing unit 214 performs processing to recognize input information which a player inputted using the input unit 260. Specifically, the input reception processing unit 214 receives instruction on a combination of a first game card and a second game card to be used, for example.

The drawing unit 220 performs drawing processing based on a variety of processing (for example, game processing) performed by the processing unit 200, generates an image thereby, and outputs the generated image to the display 290 based on the control of the display control unit 213. The image generated by the drawing unit 220 may be a so-called two-dimensional image or a so-called three-dimensional image.

The sound processing unit 230 performs sound processing based on results of a variety of processing performed by the processing unit 200, generates game sounds including BGM, sound effects and voices, and outputs the game sounds to the sound output unit 292.

4. Processing Method 4.1 Overview

Next a method of a team item acquisition control processing, including an acquisition condition determining processing in a matchup game according to an embodiment of the invention, will be described with reference to FIG. 4.

Figure 4:
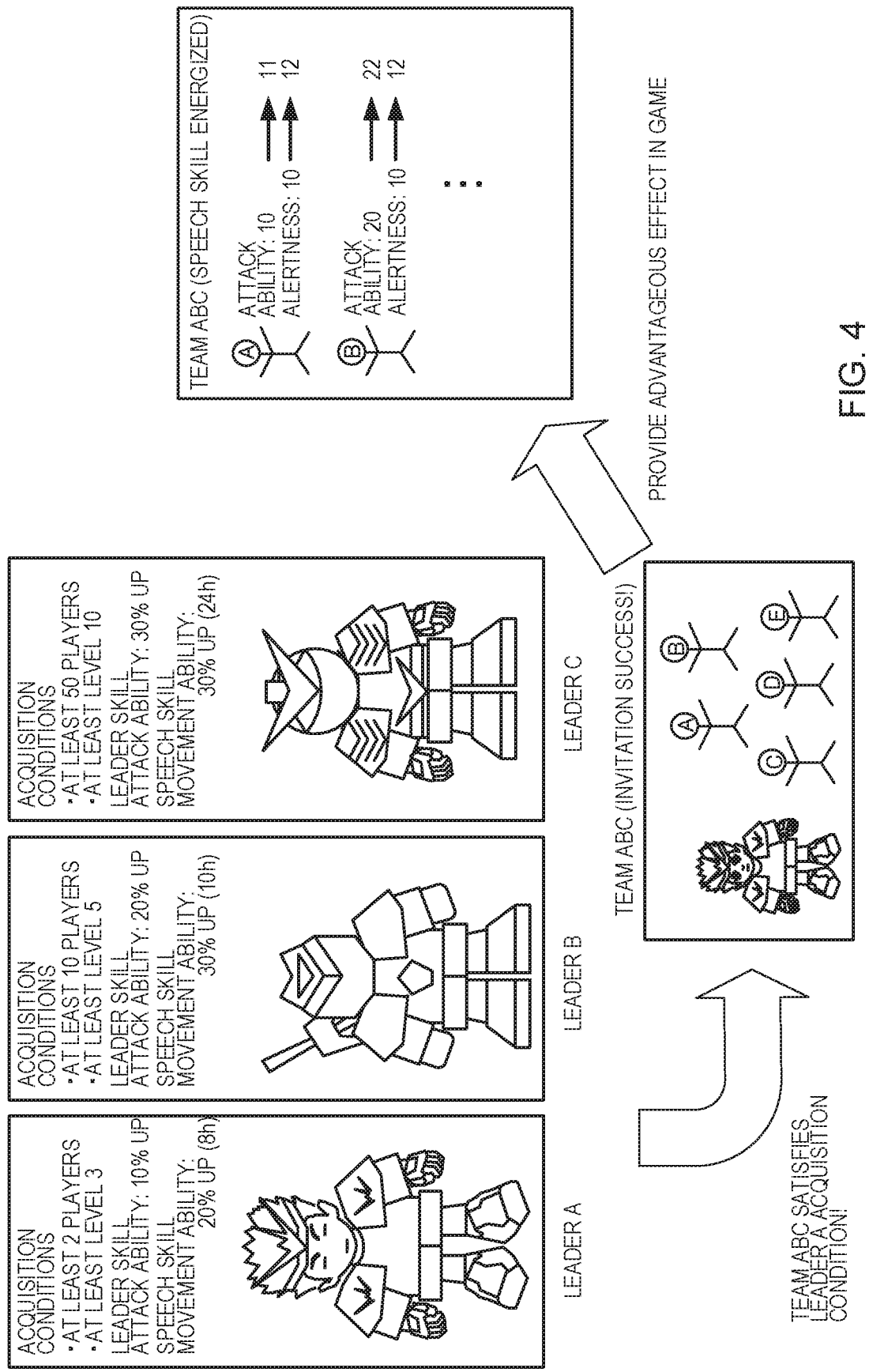
FIG. 4 is a diagram for explaining a team item acquisition control processing, including an acquisition condition determining processing in a matchup game according to an embodiment of the invention.

FIG. 4 is a diagram for explaining the team item acquisition control processing, including the acquisition condition determining processing in a matchup game according to the present embodiment.

The server 10 is configured in conjunction with the terminal 20 to provide player characters and other characters, a game space and a partial space thereof, game parameters, BGM game scenario, and the like to each player, and execute such a game as a matchup game (a battle game, an action game, and the like), RPG, a simulation game, or the like based on the operation by each player.

Moreover, the server 10 constitutes a server which performs game control to cause the terminal 20, which is connected via a network and is operated by the player, to execute a given game.

In particular, the server 10 is configured to execute various controls for each team constituted of at least a one player to matchup with each other, while controlling execution of the matchup game which an individual player plays with another player using respective player characters.

Specifically, the server 10 is configured to manage each team, including the changes in the affiliated team during a game, record of each team, players belonging to the team, a number of the players, and duration of playing as a team.

In addition, the server 10 is configured to determine whether the team item acquisition condition, which is based on the record of each player belonging to the team and the like, during the match game, and controls acquirement of the game item, which provides an advantageous effect in the game, for a team which satisfies this team item acquisition condition (that is, each player belonging to this team).

More specifically, the server 10 is configured to:
(A1) manage each team which has at least one player who plays the game using player characters;
(A2) execute control related to the game (for example, a matchup game) for each of the teams;
(A3) manage an item which is acquired by the team in the game and provide an advantageous effect in the game to the team, and acquisition number of the game item being limited;
(A4) execute, for each team, the acquisition condition determining processing to determine whether the team item acquisition condition is satisfied;
(A5) execute the team item acquisition control processing to control acquirement of the game item for the team that is determined to satisfy the first condition in the determining processing; and
(A6) provide the advantageous effect in the game to the team which acquired the item in the team item acquisition control processing.

In particular, in the case where the team item is a leader character who functions as a leader in the game, the server 10 changes a parameter related to the ability that is set for this leader character in the player belonging to the team which acquired this leader character as the advantageous effect in the game, or in the player characters of this player.

For example, it is assumed that, as illustrated in FIG. 4, each team item (leader) A to C, for which no team has yet acquired, is stored in the game data storage unit 144 as a leader character respectively, and the team item acquisition condition of each team item (game card specifying a leader who leads the team) is as follows:

leader A acquisition condition: number of players is at least 2 and team level is at least 3;
leader B acquisition condition: number of players is at least 10 and team level is at least 5; and
leader C acquisition condition: number of players is at least 50 and team level is at least 10.

In this case, if the team level of the team ABC constituted of 5 players reaches "3" during the game, the server 10 determines that the team item acquisition condition of the leader A as the team item is satisfied in the acquisition condition determining processing, and executes the item acquisition control processing to allow the team ABC to acquire the leader A as a bidding success.

In addition, if the team ABC acquires the leader A, as illustrated in FIG. 4, the server 10 provides an advantageous effect in the game specified for the leader A for this team ABC to the player characters of each player belonging to the team.

In other words, in the case of FIG. 4, the server 10 provides an advantageous effect in the game, specified for the leader A, to the team ABC, that is, permanently increasing each attack ability of the player character of each player belonging to the team ABC by 10% (as long as the leader A is held by the team), which is specified as the leader skill; and increasing each movement ability of the player characters of each player belonging to the team ABC by 20% only for an 8 hour period at most 4 times, which is specified as the speech skill.

Moreover, for parameters related to the ability that is set for the leader characters, the server 10 changes the attacking ability of the player A belonging to the team ABC from "10" to "11", changes the attacking ability of the player B from "20" to "22", changes the alertness (moving ability) of the player A from "10" to "11", and the alertness (moving ability) of the player B from "10" to "11", as indicated in FIG. 4.

By this configuration, according to the present embodiment, an advantageous effect can be provided to the whole team when the team item, as the game item, is acquired by cooperation of the players belonging to the team.

Therefore, according to the present embodiment, the sense of unity of the players belonging to the team can be increased, and the entertainment level in a game, in terms of a team competition over records in a matchup game or the like, can be improved, exceeding the level of an individual match.

In particular, according to the present embodiment, competition among teams to acquire a team item, which provides an advantageous effect in the game, can be heated by making a number of team items to be acquired to be less than a number of teams participating in the game, hence the team match can be energized, and the entertainment level of the game can be improved.

It should be noted that in the present invention, a team item is used in the description as the game item. However, instead of the team item, a player character or an item (including an ability and characteristic) to be the operation target or instruction target of the player, and cards used for a game (in other words, game cards electronically provided), in which [the player character or item] is specified, may be used as the game item, as long as the game item has an effect on the team or on all players belonging to the team. Furthermore, according to the present embodiment, the team item is used for description to represent the game item, unless otherwise specified.

A game described in the present embodiment is a matchup game of performing the domestic affairs game at the bases of each player and each team (a so called "city building game"), and attacking the bases of an opposing team and the bases of other players belonging to the opposing team, so as to complete for ranking. However, games [to which the present invention can be applied] are not limited to this, as long as the game is executed by a team that each player belongs to.

4.2. Player Information and Team Information

Player information and team information of the present embodiment will be described with reference to FIG. 5A and FIG. 5B. FIG. 5A and FIG. 5B are examples of the player information and the team information stored in the player information storage unit 146.

4.2.1 Player Information

The player information includes, for example, the following information indicated in FIG. 5A:

(A1) nickname, player ID, affiliated team name and ID [of the team] (hereafter referred to as "affiliation information") of the player;

(A2) information on the attributes (hereafter referred to as "attribute information") of the player, and information on the level (hereafter referred to as "level information") of the player;

(A3) acquired score, points and items (including quantity and types, hereafter also referred to as "player items"), or information on the individuals and team related to the records in each game field, such as other rewards (hereafter referred to as "record related information"), and information on the records of the individuals and teams in the matchup game as a whole (hereafter referred to as "total record information");

(A4) information on the characteristic and attribute of the player character and the type of the item (including ability of the item) owned by this player character (hereafter referred to as "player character information");

(A5) information on the base, which is the start point from which the player character departs to play a game match, including such information as a position of the base in the game space which each player sets in each game field (hereafter referred to as "base information");

(A6) information on benefit acquired by each player (hereafter referred to as "benefit information");

(A7) information on billing, such as billing history and billed amount (hereafter referred to as "billing information"); and (A8) information on play history and information on the login history of each player (hereafter referred to as "history information").

The above-mentioned information is stored in the player information storage unit 146.

It should be noted that in the present embodiment, the player items include game currency, and includes not only such items as a sword and a shield, but also an ability (including number, type, quantity or the like) or a characteristic.

The record related information and the total record information described above are updated at every predetermined timing. Examples of the predetermining timing include: every given period (for example, every 5 minutes), a timing when the player logs out, a predetermined timing in the game (8:00 AM or the like), and a timing when a predetermined event is generated (timing when any individual match or team match ended).

4.2.2. Team Information

The team information includes, for example, the following information indicated in FIG. 5B:

(B1) team ID;

(B2) player names and player IDs of the leader and sub-leader;

(B3) a number of players belonging to the team;

(B4) team level;

(B5) team-based parameters related to the players or player characters, such as an experience value, score, points or physical power value;

(B6) team item as a game item the team acquired;

(B7) contribution to the team of players belonging to the team (degree of providing commodities, such as goods, and funds, such as game currency, from each player);

(B8) duration since formation of the team (period of duration);

(B9) team-based information on a number and types of game stages, and tasks cleared by players belonging to the team (hereafter referred to as "team achievement information" or "achievement information"); and (B10) information on team record calculated from record related information and total record information of each player belonging to the team (hereafter referred to as "team record information" or "record information").

In particular, the team item is an item which is acquired by a team, and provides an advantageous effect in the game to this team which acquired the item.

Furthermore, a number of team items is less than a number of teams participating in the game, that is, the acquisition number of the team items is limited for acquisition, in order to heat up the competition among teams over the item, which provides an advantageous effect in the game, and information on the team item is stored in the game data storage unit 144 as the team item information.

Moreover, for example, a predetermined number of team items may be prepared at the game start considering the number of teams or considering a number of players to participate, and the number of items is stored in the team item information.

In addition, a number of team items may be increased as a number of teams increases, so as to adjust for the difficulty in acquiring the team items.

In the case where [a number of team items] decreased in the course of the progress of the game due to the merger of teams, for example, the number of team items remains the same, or may be adjusted in accordance with the updated number of teams, so that [the number of team items] becomes less than the number of teams.

In addition, according to the present embodiment, the team item is a leader character which functions as a leader in the game, for example.

Moreover, in the team item information of each team item, a team item acquisition condition, which is required for each team to satisfy in order to acquire the team item, and is used in the team item acquisition control processing, is specified as described above. Each team item is acquired by a team which satisfies this team item acquisition condition.

The team item acquired by each team is managed by the item managing unit 108. The team item information stored in the game data storage unit 144 is registered, in association with each team, in the player information storage unit 146.

Furthermore, the item managing unit 108 manages the team items, of which acquisition number is limited, based on the team item information stored in the game data storage unit 144.

In addition, the team item is controlled as an NPC in the present embodiment, but may be controlled based on the instruction by the player.

In the team item information on the team item acquired by each team, information related to the advantageous effect in the game provided to the team which acquired this team item (hereafter referred to as "effect information") is specified.

In particular, the effect information includes:

(C1) information to improve the ability of the team, each player belonging to the team, or each player character operated by each player (information to increase the current ability value and information to add a new ability);

(C2) information to increase various parameters, including points, scores, game currency, experience value or the like of the team or the player belonging to the team; or
(C3) information to increase the winning probability of the loot box executed by the team or the player belonging to the team.

For example, the effect information includes:
(D1) in the case where the provision of the advantageous effect in the game is limited to a specific player belonging to the team (leader, sub-leader or player having a specific item), information on this specific player (in other words, information on the effect provided to the player);
(D2) in the case where the period in which the advantageous effect in the game is provided (hereafter referred to as "effect providing period") is predetermined, information on this period (in other words, information on the effect providing period); and
(D3) in the case where the period in which the advantageous effect in the game is provided is predetermined, information on the number of times provided (for example, unlimited or predetermined number of times).

Furthermore, for a team item, such as the leader character, a level (hereafter referred to as "team item level") is specified. The value of this team item level changes depending on the experience value of each team, other items, such as the materials acquired by a player character in the game, or the expenditure of the game currency (including billing) (in other words, [the game item level] increases or decreases in the direction that is advantageous to the player).

As the team item level increases, the change amount of the parameters specified for the player of the team or the player character of the player, who has this team item having the advantageous effect in the game, also changes.

Moreover, when the team item is taken by another team, the team item is transferred to the other team without changing their team item level at the time of transfer.

Therefore, according to the present embodiment, such a strategy of allowing the team item level to be increased by other teams to the maximum, and then stealing this team item, in some cases becomes effective.

4.3. Game Control Processing for Matchup Game Among Players

Next, game control processing for a matchup game among players executed by the server 10 will be described with reference to FIG. 6 to FIG. 9A and FIG. 9B.

Figure 6:
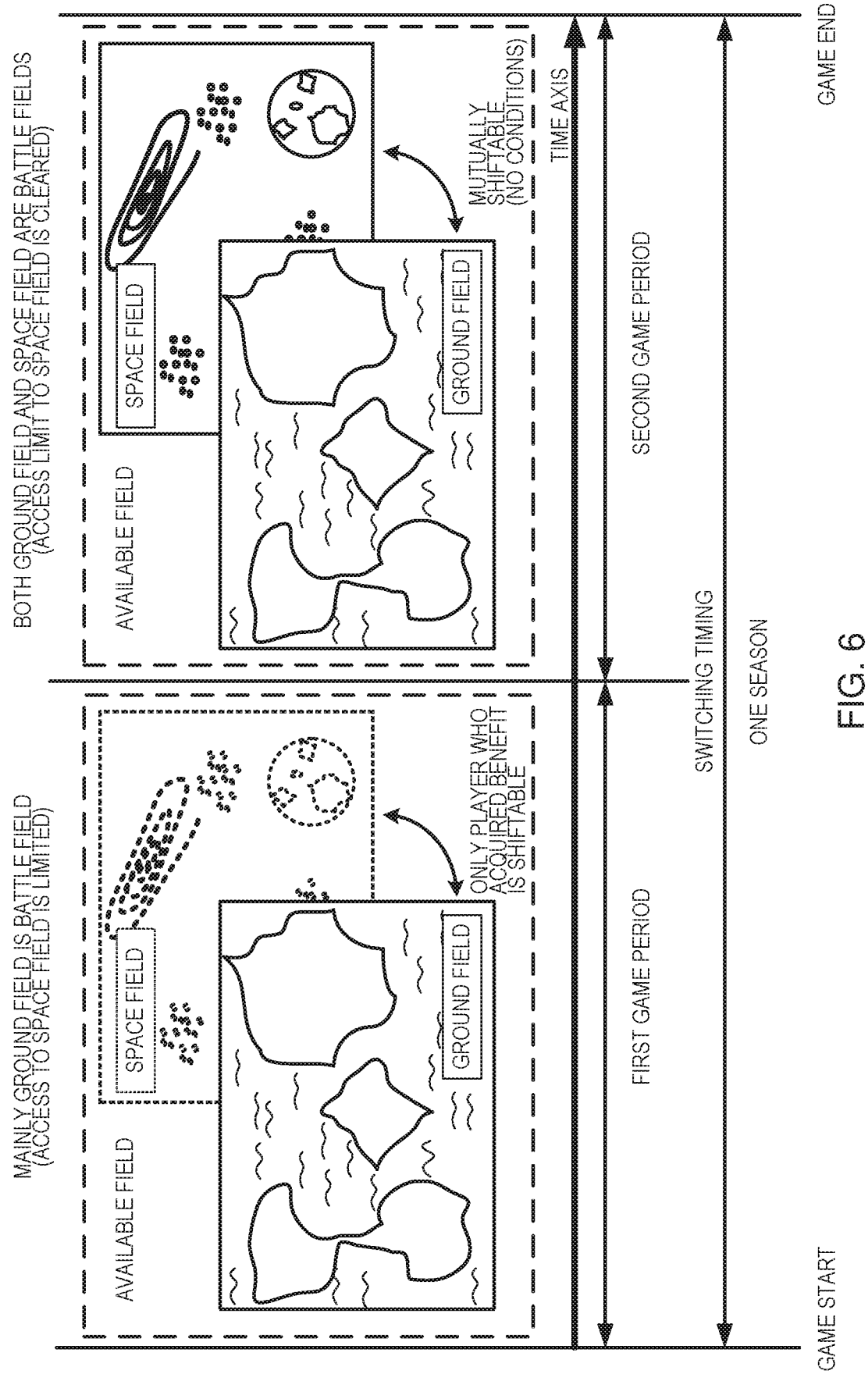
FIG. 6 is a diagram for explaining game control processing in a matchup game according to an embodiment of the invention.

FIG. 6 is a diagram for explaining the basic principle of the matchup game, and FIG. 7 to FIG. 9A and FIG. 9B are diagrams for explaining game control processing for the matchup game which is executed by the server 10.

4.3.1. Basic Principle of Matchup Game

In order to expand the game fields during the matchup game and activate the game, the game managing unit 103 controls the matchup game among players and among teams using the player characters, based on a game period (that is, a season) constituted by a first game period when the game progresses mainly in a first game field, and a second game period when the game field is not only the first game field but is expanded to a second game field.

In particular, the game managing unit 103 is configured to execute a game using a general map (that is, a game space) constituted by at least 2 game fields: a first game field, such as a ground or a space; and a second game field that is different from the first game field.

For example, as illustrated in FIG. 6, a matchup game that is controlled here is assumed to be a matchup game in which one season (for example, 2 months) is constituted by a first game period, which is a predetermined period (for example, 1 month) from the start of the game, and a second game period, which is a predetermined period (for example, another 1 month) from the end timing of the first game period (hereafter referred to as "switching timing"). In the matchup game, each team constituted of a plurality of players compete for the bases in a first game field, which is a game field on the ground (hereafter referred to as "ground field"), and a second game field, which is a game field in the space (hereafter referred to as "space field").

In this case, the game managing unit 103 develops the matchup game almost exclusively in the ground field during the first game period, as illustrated in FIG. 6. At this time, the game managing unit 103 controls the game so as to, for example, specify a player, who acquired a base disposed on the ground field to advance to the space field, to be a specific player who satisfied a given condition, and allow this specific player to acquire a right to access the space field during the first game period.

In other words, in this case, only when a specific player acquired the benefit, the server 10 controls the game field of this specific player to be shiftable to the space field, and restricts the other players to access the space field using their player characters.

In the second game period, on the other hand, the server 10 clears the access limit of all the players to the space field, so that the matchup game can be developed in both the ground field and the space field, as illustrated in FIG. 6.

4.3.2. Game Control Processing in First Game Field in First Game Period (Domestic Affairs Game)

When the first game period starts, the game managing unit 103 sets a base for the first game field (hereafter referred to as "headquarters"), which is used as a military base of the player characters (mother ship, robots loaded on mother ship, and the like) operated by each player, at a position in the first game field instructed by each player.

Then as a domestic affairs game (so called "city building game"), the game managing unit 103 executes various types of game control processing to allow each base to grow, at the headquarters of each player based on the instruction by each player, such as building (including reinforcing) and repair of the mother ships used for matchup, manufacturing (including reinforcing) and repair of the robots and fighter aircraft loaded on the mother ships, and building each facility, including production facility and defense facility.

In particular, as the domestic affairs game, the game managing unit 103 executes the growth management related to each player character and the headquarters using various parameters.

Figure 7:
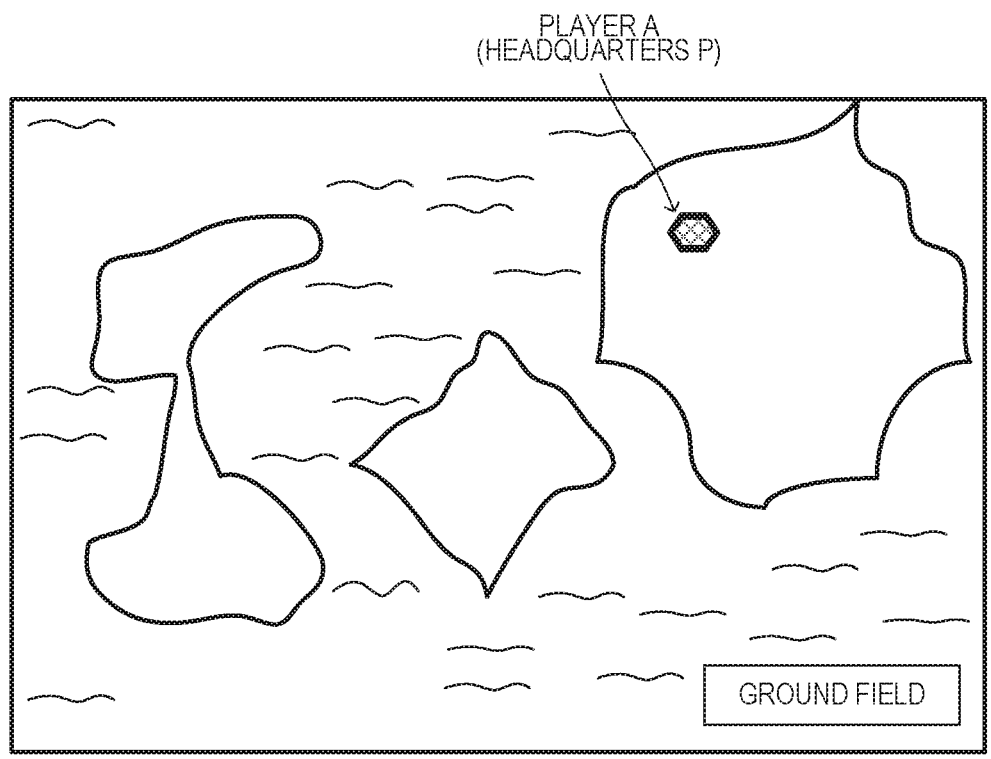
FIG. 7 is a diagram for explaining game control processing for a matchup game which is executed by a server according to an embodiment of the invention.

For example, as illustrated in FIG. 7, the game managing unit 103 sets the headquarters in the ground field (the first game field). Further, as the domestic affairs game, for each headquarters, the game managing unit 103 controls the increase/decrease of the various parameters related to the mother ships, robots and each facility based on the instruction by the player, and executes a variety of processing to reinforce the mother ships, the robots and the headquarters.

FIG. 7 is a diagram illustrating the case where the headquarters P of the player A is set in the ground field (the first game field).

On one hand, in the case of a battle game in which each player matches up with another player using the player characters, if a base occupied by another player (hereafter referred to as "occupied base") or a base occupied by NPC (hereafter referred to as "strategic base") is acquired, the game managing unit 103 sets each parameter related to the defense of the acquired base (that is, the occupied base) based on the instruction by the player in order to prepare for an attack from other players.

On the other hand, in the case of the domestic affairs game, the game managing unit 103 executes a determining processing to determine a team to which a player belongs (hereafter also referred to as "team determining processing"), such as reinforcement of the team level (reinforcement based on payment of game currency or the like to the team), and determining a new team to which a player belongs to when teams are formed, and a changing processing to change the already determined team of the player (hereafter referred to as "team changing processing").

4.3.3. Game Control Processing in First Game Field in First Game Period (Battle Game)

In the first game period, the game managing unit 103 controls the battle game using the player characters in the game space while limiting access of the player characters to the second game period, based on the instruction by each player.

In particular, in the first game period, the game managing unit 103 controls to not allow all the player characters to access the second game field, but to allow only the player characters of a specific character having a benefit to access the second game field.

Figure 8:
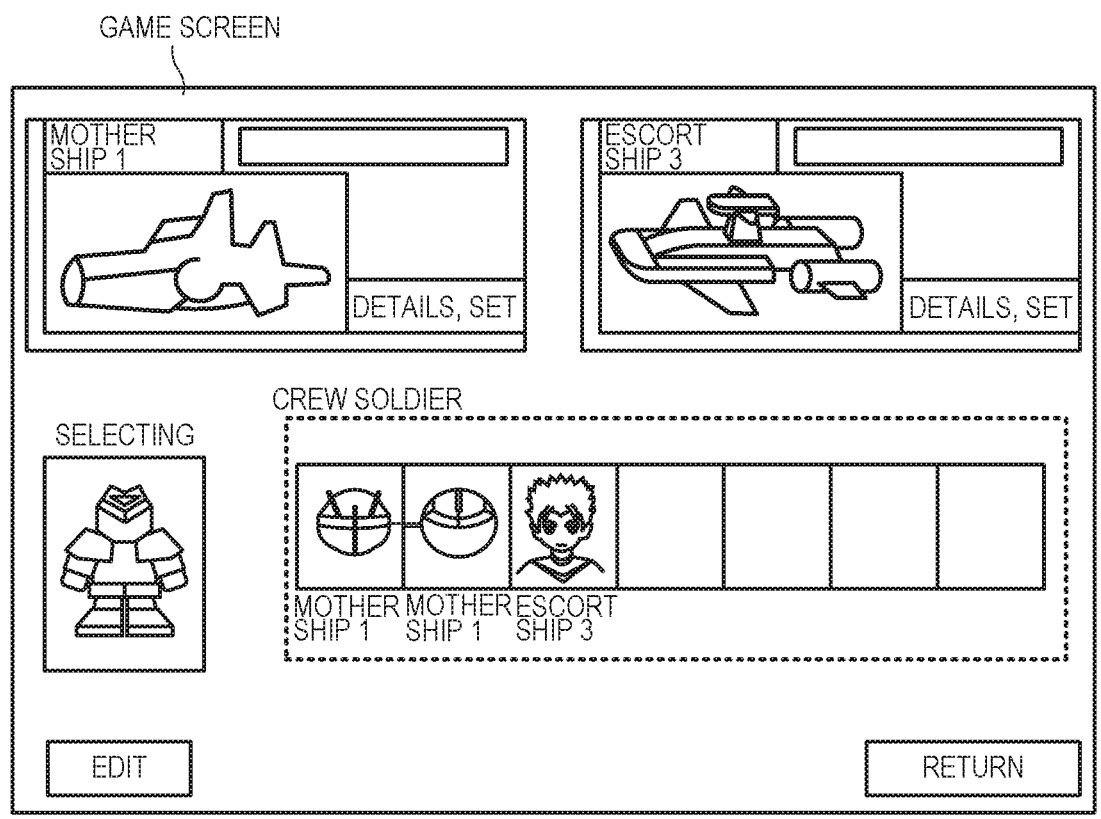
FIG. 8 is a diagram for explaining game control processing for a matchup game which is executed by a server according to an embodiment of the invention.

Specifically, as illustrated in FIG. 8, the game managing unit 103 sets, for example, a deck constituted of a player character or a plurality of player characters to attack other bases, including setting the type, number and ability of attack ships, and setting robots and fighter aircraft loaded on each attack ship.

FIG. 8 is a diagram illustrating an example of the game screen for setting an attack ship and crew on the attack ship, which are set on the deck used for the battle game as player characters.

Figure 9A:
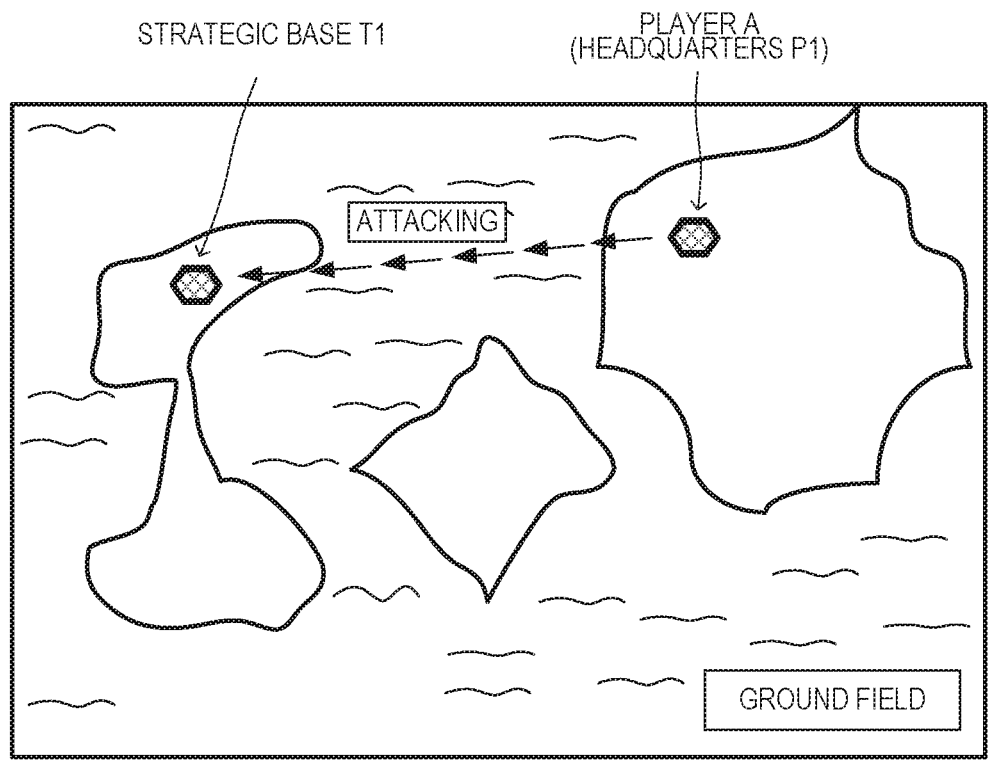
FIG. 9A and FIG. 9B are diagrams for explaining game control processing for a matchup game which is executed by a server according to an embodiment of the invention.

On the other hand, as illustrated in FIG. 9A, for example, the game managing unit 103 executes various types of processing related to the battle games, such as a simulation game and an action operation game, based on the player characters and the deck which were set, by attacking the headquarters of other players, occupied bases of the other players, and the strategic bases occupied by NPC, for example.

Figure 9B:
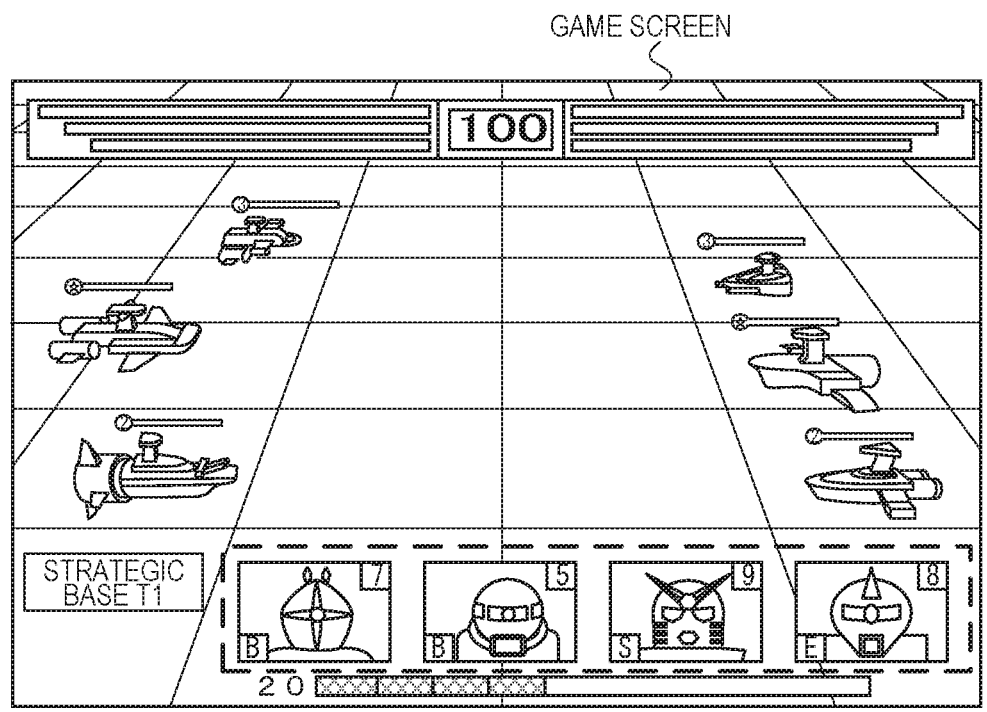

Specifically, in the case of the simulation game, based on a command received in accordance with the operation instruction by the player and information related to a player character of another player which is different from the player character for which the command was received, the game managing unit 103 computes the movement during the turn of the player character for which the command was received in the game space, as illustrated in FIG. 9B. Then based on this operation result, the game managing unit 103 executes the game control processing which automatically controls the movement of the concerned player character.

Moreover, in the case of the simulation game, based on various parameters of the player characters, the deck, and the like that are set, and various parameters of each attack target base, the game managing unit 103 executes automatic operation related to the matchup for attacking the bases (headquarters and occupied bases) of the other players, generates automatic operation data, such as acquisition of a base, acquisition failure of a base, battle process (processing related to the attack or defense of each player character), final state of player characters (each player character that is set on the deck), and the like, and stores the generated automatic operation data in the operation data storage unit 148.

In the case where the instruction to reproduce the automatic operation data is received from the terminal 20, the game managing unit 103 performs the game reproducing processing to reproduce and display the game screen on the terminal 20 via the information providing unit 111. The game managing unit 103, however, may provide the automatic operation data itself to the concerned terminal 20, and have this terminal 20 reproduce the automatic operation data.

It should be noted that FIG. 9A is a diagram illustrating an example in the case of a game control processing, where the strategic base T1 is attacked from the headquarters P1 of this player A based on the command inputted by the player A. FIG. 9B is a diagram illustrating an example of a game screen of the battle game at the strategic base T1 which is played as the simulation game.

On the other hand, in the case of executing the battle game to attack the headquarters, for example, the game managing unit 103 executes the simulation based on each parameter of the player characters or the deck on the attack side, and each parameter related to the defense which is set for this headquarters. If the attacking side wins, the game managing unit 103 executes the game control to occupy the headquarters for a predetermined period, and interrupts the domestic affairs operation of the opponent player who lost.

Moreover, in the case of executing the battle game to attack an occupied base or a strategic base, for example, the game managing unit 103 executes the simulation based on each parameter of the player characters or the deck on the attack side, and each parameter that is set by another player or NPC at a strategic base. Then the game managing unit 103 executes the game control, so that the winning side occupies this strategic base.

4.3.4. Process to Switch Game Period

When a given timing is detected in the first game period, the game period managing unit 105 executes the game period switching processing to switch the first game period to the second game period, in which the game field is expanded from the first game field to the second game field.

In particular, examples of the "given timing" include:
(A1) timing when a predetermined period has elapsed from the start of the first game period;
(A2) timing when any player (including a plurality of players) reached a predetermined game level, timing when a specific item is acquired, or timing when a predetermined parameter, such as a score or experience value, reached a predetermined value; and
(A3) timing when the game situation in the first game period has become a predetermined situation, such as timing when a number of participating players reached at least a predetermined number, or timing when a predetermined number of specific items are acquired by a group constituted of a plurality of players.

When [the first game period] is switched to a second game period, the game managing unit 103 controls the matchup game using the player characters in the game space in the state where the access limit of the player characters to the second game field is cleared.

In other words, the game managing unit 103 performs setting so that the player characters of the player participating in the matchup game in the second game period can freely access the second game field.

Basically, the game managing unit 103 performs setting so that the player characters of the players not participating in the game in the second period, such as players who dropped out due to defeat in the first game period, for example, cannot access the second game field.

However, in the case where the defeated player is revived, for example, the game managing unit 103 may perform setting so that the player characters of this player can freely access the second game field.

4.3.5. Game Control Processing in Each Game Feld of Second Game Period (Domestic Affairs Game)

When [the first game period] is switched to the second game period, excluding the case where a specific player accessed the second game field in the first game period using a benefit, and has already generated [each headquarters], the game managing unit 103 determines a position of each headquarters in the second game field randomly (that is, not based on the operation instruction by each player), and sets the headquarters used for the second game field.

Then just like the case of the first game field, the game managing unit 103 executes each game control related to the domestic affairs game for each headquarters which was set.

For example, the game managing unit 103 sets the headquarters in the space field (second game field). Further, as the domestic affairs game, at each headquarters, the game managing unit 103 controls the increase/decrease of the various parameters related to the mother ships, robots and each facility based on the instruction by the player, and executes various types of processing to reinforce the mother ships, the robots and the headquarters.

It should be noted that the game managing unit 103 continuously controls the domestic affairs game and the battle game in the first game field, even in the second game period. When the second game period is started, however, the game managing unit 103 may end various games in the first game field.

On the other hand, in the case of the domestic affairs game, the game managing unit 103 executes the reinforcement of the team level (reinforcement based on the payment of game currency or the like to the team), the team determining processing to determine a team to which a player belongs to, such as determining a new team to belong to when teams are formed, and team changing processing to change the already determined team of the player, just like the case of the first game.

4.3.6. Game Control Processing in Each Game Field in Second Game Period (Battle Game)

Just like the case of the first game field, if an occupied based occupied by other players or a strategic base is acquired in the battle game, the game managing unit 103 sets each parameter related to the defense of the acquired base (that is, the occupied base) based on the instruction by the player in order to prepare for an attack from other players.

Furthermore, just like the case of the first game field, the game managing unit 103 sets, for example, a deck constituted of a player character or a plurality of player characters to attack other bases, including setting of the type, number and ability of the attacking mother ships, and setting of robots and fighter aircraft loaded on each mother ship, based on the instruction by each player.

Then, just like the case of the first game field, the game managing unit 103 executes various types of processing related to battle games, such as the simulation game and the action operation game, based on the player characters and the deck which was set, by attacking the headquarters of the other players and the occupied bases of the other players and strategic bases.

When a given timing is detected during the second game period, the game period managing unit 105 executes, in conjunction with the game managing unit 103, processing to complete one season by ending the second game period.

In particular, when the game period managing unit 105 detects a predetermined timing, such as a predetermined timing during the second game period, or a timing when a predetermined item is acquired by any player or team, the game managing unit 103 ends one season by ending the second game period.

4.3.7. Turn-Based Game Control Processing

The game managing unit 103 executes turn-based game control processing for the domestic affairs game (so called city building game) and/or the battle game.

In other words, when the reception processing unit 104 receives a command instructed by a concerned player at each turn of each player during the first game period and the second game period, the game managing unit 103 executes the control related to the concerned player characters in each turn based on this received command.

In particular, based on the received command and the information related to the player character for which this command is received, the game managing unit 103 computes the operation, such as the attack, defense and movement of the player character, for which this command is received, in this turn in the game space. Then based on this computing result, the game managing unit 103 executes the control (that is, the operation control) related to this player character.

In the case of computing the movement of the player character in this turn, the game managing unit 103 may calculate this movement including the player information. In the case of playing a matchup game with an opposing player including NPC, the game managing unit 103 may compute the movement of the player character (including the movement of the opposing player) using the information related to the opposing player character or player information on the player operating this opposing player character.

As a control related to the player character, the game managing unit 103 may execute, not only the movement control, but also setting of armaments, characteristics and abilities of this player character, setting of attack targets, setting of joint operations with another player character (including combined attack or the like), setting of movable body (mother ship, robots, fighter aircraft, or the like) on which the player character boards, and settings related to bases and cities to which this player belongs to (increasing the attack force and defense force).

Furthermore, in the case of executing the turn-based game control processing using a deck on which a plurality of player characters are set, each time the operation instruction for one player character is received, the game managing unit 103 may control the movement of the player character alternately with the player character of the opposing player in each turn. Alternatively, each time the operation instruction for a plurality of players, which are set on each deck (that is, for each player), are received, the game managing unit 103 may control the action of all the player characters which are set on the deck in each turn.

4.4. Game Control Processing in Matchup Game Among Teams

Next, the game control processing in the matchup game among teams, executed by the server 10, will be described.

4.4.1. Forming a Team and Changing Affiliation

The game managing unit 103 is configured to form a team constituted of at least one player, to newly join an already formed team, and to transfer from a current team to another team, based on the instruction by the player or randomly, when the matchup game is started or during the matchup game.

In other words, the game managing unit 103 executes forming a new team (execution of team formation), team determining processing to determine a team, such as a new team, to which a player belongs to, and team change processing to change the current team a player belongs to.

In particular, when a new team is formed in the team determining processing, the game managing unit 103 sets, for each team, a name, a player to be the leader and a player to be the sub-leader. Further, the game managing unit 103 sets a base to be the headquarters of the team (hereafter referred to as "team base") in the game space based on the instruction by the leader or the sub-leader. Then the game managing unit 103 registers the above information that was set, to the player information storage unit 146 as the team information.

A new team can be established even for one player. However, in terms of a sense of unity among players, it is preferable that one team to be formed is constituted of a plurality of players.

In the present embodiment, the game managing unit 103 can set the team bases only in the first game field (that is, the ground field), but may be configured to set the team bases in each game field.

On the other hand, the game managing unit 103 is configured to transfer a player from a current team to another team based on the decision of the player or request from the leader or the sub-leader during the matchup game.

In particular, in the case of a team increasing its attractiveness by acquiring items having advantageous effects on the whole team, the team can expect the participation of many players, whereby even more items having advantageous effects can be acquired. In such a case, the team can be managed in positive cycles.

Specifically, based on the instruction by the player to be transferred, or based on the instruction by the leader or the sub-leader of the team, the game managing unit 103 executes the team change processing to delete the various information on this player from the team information of the current team, and register the various information on this player in the team information of the new team.

It should be noted that for the team change processing, the game managing unit 103 may be configured to change the team randomly or in accordance with the game situation.

4.4.2. Matchup Game (Battle Game) Processing Among Teams

The game managing unit 103 executes the processing to play the matchup game in the first game field and the second game field described above, in cooperation with each player on the same team.

Specifically, the game managing unit 103 arranges player characters (mother ships, crews boarding the mother ships, and the like) on the team bases to defend the team by players belonging to the team, so that the attacks of opposing teams on the team bases are defended.

Furthermore, in order to attack the team bases of the opposing team and headquarters and strategic bases of the opposing players, the game managing unit 103 sets the player characters (attack ships, crews boarding the attack ships) to attack a player belonging to the same team. Then the game managing unit 103 plays the battle game with the opposing team in the same manner as the battle game among players using the player characters which are set.

In this embodiment, the game managing unit 103 sets a deck using player characters which attack a player belonging to the same team, and executes the simulation game using this deck and the deck of the opposing team.

In other words, the game managing unit 103 executes automatic operation related to the matchup game using the deck that was set and the deck of the opposing team. The game managing unit 103 also generates automatic operation data related to acquisition of a base, failure of acquisition of a base, steps of the battle (processing related to the attack and defense of each player character), and final state of each player character (each player character which is set in the deck). Then the game managing unit 103 stores the generated automatic operation data in the operation data storage unit 148.

4.5. Team Item Acquisition Control Processing

Next, the team item acquisition control processing executed by the server 10 will be described.

4.5.1. Basic Principle of Team Item Acquisition Control Processing

During the matchup game, the item acquisition control unit 106 executes the acquisition condition determining processing to determine, for each team, whether the team item acquisition condition for a team item which is not yet acquired by other teams is satisfied or not. For the team which was determined that this team item acquisition condition is satisfied in the acquisition condition determining processing, the item acquisition control unit 106 executes the team item acquisition control processing to control acquirement of the game item.

Then the item acquisition control unit 106 executes the acquisition condition determining processing to determine whether game elements related to the growth of each team in the game, or game elements related to the growth of each player belonging to each time in the game, satisfy the team item acquisition condition.

In particular, in the present embodiment, the team item acquisition condition refers to a condition related to a growth of each team in the game, or a growth of each player belonging to each time in the game. The team item acquisition condition is also a condition related to game elements which change as a team, when each player belonging to each team executes the game.

Specifically, the team item acquisition condition includes conditions related to game elements, such as:

(A1) a number of players belonging to the team;
(A2) acquisition as a team, of an item (including game currency), ability (including a number, type, quantity or the like), or characteristic (including a number, type, quantity or the like) used by a player character of each player belonging to this team;
(A3) parameters related to players or player characters, including experience values, scores, points, or physical power values of the whole team;
(A4) level of the team;
(A5) contribution of each player belonging to the team to this team (ratio of funds provided by each player, such as commodities (items) and game currency);
(A6) duration since formation of the team (period of duration);
(A7) a number and types of game stages and tasks which players belonging to each team cleared as a team; and
(A8) combinations of at least two of (A1) to (A7).

Moreover, the item managing unit 108 manages team items, for which team item acquisition condition is specified respectively, including information on whether each team item has been acquired. For each team, the item acquisition control unit 106 determines whether the team item acquisition condition is satisfied or not for each team item which has not yet been acquired by other teams, and controls acquirement of the game item for the team which was determined that this team item acquisition condition is satisfied.

For example, it is assumed that for a team item A which has not yet been acquired by any team, a team item acquisition condition that is set to acquire the team item is that a number of players belonging to the team is "10", and the level of the item is at least "20". In this case, the item acquisition control unit 106 controls acquirement of the team item A for the team which satisfies this team item acquisition condition.

A number of team items is limited, hence even if the team item acquisition condition for a team item is satisfied, this team item cannot be acquired if another team has already acquired this team item.

In other words, in the case where the team satisfies the team item acquisition condition for a team item which has not yet been acquired by another team, the item acquisition control unit 106 may automatically control acquirement of the team item satisfying the team item acquisition condition. Further, in the same case and if the team desires (specifically if the acquisition instruction is received from the leader or sub-leader), the team item acquisition control unit 106 may control the acquirement of the team item, which satisfies the team item acquisition condition, for this team.

Moreover, for a team item which provides a more advantageous effect, the item managing unit 108 may set a stricter team item acquisition condition.

In this case, the team item acquisition condition is set in accordance with the effect provided by the team item, and a strategy to acquire the game item becomes essential. Thereby playability can be increased and the entertainment level of the game can be improved.

4.5.2. Team Item Transfer Control Processing (Competition Control Processing)

The item acquisition control unit 106 may execute the transfer control processing to transfer a team item owned by a specific team to another team. For example, it is assumed that a game having matchup elements, such as a battle game, is executed between a first team which has already acquired a team item during a game and a second team which is different from the first team. In this case, if the second team wins in the game having the matchup elements, the item acquisition control unit 106 executes the transfer control processing to transfer the team item owned by the first team to the second team.

In particular, the game executed here is not limited to a direct battle game, but may be a game in which teams compete for a win/loss game result, such as a mini-game, and the item acquisition control unit 106 may execute such game control processing (that is, competition control processing) to transfer a team item depending on the win/loss result, or to allow the original team to hold the team item without transfer, for example.

In the case of transferring the team item owned by the first team to the second team by the competition control processing, as mentioned above, the item acquisition control unit 106 may transfer the team item in the state of holding the value of the team item level specified for this team item.

As the team item level increases, the change amount of the parameter specified for each player of the team having this team item or player characters of this player also changes, hence if the second team acquires a team item having a high team item level, the ability of the player characters of each player can be powerfully reinforced.

In other words, in the present embodiment, such a strategy of allowing the team item level to be increased by the other team to the maximum, and then stealing this team item, in some cases becomes effective.

4.5.3. Advantageous Effect in Game

When a team item is held by a team, the game managing unit 103 provides an advantageous effect in the game, which is predetermined for this team item, to the whole team (that is, to each player belonging to this team).

In particular, in the case where the team item is a leader character that functions as a leader in the game, the game managing unit 103 changes, as to the advantageous effect in the game, the parameters related to the ability (attack ability, defense ability, movement ability, or the like) that are set for this leader character in the players belonging to the team that acquired this leader character or in the player characters of these players.

(B1) An example of the advantageous effect in the game is that the game managing unit 103 improves the ability of the team, each player belonging to the team, or each player character which each of these players operates. In particular in this case, an increase in the current ability value and the addition of a new ability are included.

(B2) Another example of the advantageous effect in the game is that the game managing unit 103 increases various parameters, such as points, scores, game currency or experience values of the team or the players belonging to the team.

(B3) Still another example of the advantageous effect of the game is that the game managing unit 103 increases the winning probability in the loot box executed by a team or a player belonging to the team.

It should be noted that the game managing unit 103 may provide the advantageous effect in the game which the team item brings out only to some of the players, such as to the leader, sub-leader or a player having a specific item.

Moreover, the game managing unit 103 may constantly provide [the advantageous effect in the game] to the whole team while the team item is held by the team. Further, the game managing unit 103 may provide [the advantageous effect in the game] to the whole team for a predetermined period when a player (for example, such as specific player as a leader or a sub-leader) instructed, for example.

In addition, in the case of providing the advantageous effect in the game to the whole team for a predetermined period, the game managing unit 103 may provide [the advantageous effect] without limit, or for a specified limited number of times.

On the other hand, the game managing unit 103 may increase a level of such a team item as a leader character owned by a team (that is, a team item level) by the experience value or physical power value of the team having the team item, by other items acquired by a player character belonging to the team in the domestic affairs game (e.g. raw materials), or by spending the game currency (including billing).

In the case where [the provided advantageous effect] is the leader character, the game managing unit 103 may increase the level of the team item (leader character), depending on the duration period of holding the team item, such as increasing the team item level by "1" each time 1 day passes since the time of acquisition.

As mentioned above, if the team item is stolen by another team, the item acquisition control unit 106 transfers the team item in the state of holding the value of the team item level at this time.

2.5.4. Providing Privilege

In the case where a team which acquired a team item is holding this team item until the end point of the game, the item acquisition control unit 106 may provide a given benefit to the team, so that each player can channel energy into holding the team item until the end of the game.

In particular, the given benefit provided by the item acquisition control unit 106 may be one of the following:
(C1) acquisition of an item (excluding a team item) that can be used in the game;
(C2) execution of the loot box;
(C3) acquisition of bonus point or game currency; and
(C4) acquisition of a prize, such as a medal and trophy (electronic prize).

On the other hand, to prevent a team which does not hold a team item from losing a chance to reverse the situation, the item acquisition control unit 106 may provide a given benefit as a relief measure to the team which does not hold the team item.

Specifically, the item acquisition control unit 106 may:
(D1) execute determining processing to determine whether a team, which has not acquired a team item, satisfies a condition which is set to be disadvantageous in the game than the team item acquisition condition (hereafter referred to as "benefit acquisition condition") at a predetermined timing during the game or at a timing of the end of the game (this determining processing is referred to as "benefit condition determining processing"); and
(D2) provide a given benefit to the team if it is determined that this benefit acquisition condition is satisfied.

In particular, for the benefit acquisition condition, the item acquisition control unit 106 uses conditions related to the game elements, just like the case of the team item acquisition conditions, and examples thereof include:
(E1) a number of players belonging to the team;
(E2) acquisition, as a team, of an item (including game currency), ability (including a number, type, quantity or the like), or characteristic (including a number, type, quantity or the like) used by a player character of each player belonging to this team;
(E3) parameters related to players or player characters of a whole team, including the experience values, scores, points or physical power values of the whole team;
(E4) level of the team;
(E5) contribution of each player belonging to the team to this team (ratio of funds provided by each player, such as commodities (items) and game currency);
(E6) duration since formation of the team;
(E7) a number and types of game stages and tasks when players belonging to each team cleared as a team; and
(E8) combination of at least two of (E1) to (E7).

It should be noted that these conditions are set to be more disadvantageous (more difficult to satisfy) than the team item acquisition conditions, as mentioned above.

Further, in this case, as the given benefit, the item acquisition control unit 106 allows to execute the following:
(F1) acquisition of items that can be used in the game, such as an unbeatable item and a team item;
(F2) execution of the loot box; and
(F3) acquisition of bonus points or game currency.

It should be noted that this benefit is preferably a benefit that makes it possible to reverse the situation of a team holding the team item, and allows the team which was unable to acquire this team item to maintain motivation to continue the game to the end.

4.6. Record Managing Processing

Next the record managing processing executed by the server 10 will be described.

4.6.1. Record Managing Processing During Season

The record managing unit 107 manages the total record information which indicates the record of the matchup game of each player, based on: first record related information related to the record of each player in the matchup game (domestic affairs game and battle game), which is information generated by the control related to a game in the first field game field; and second record related information related to the record of each player in the matchup game, which is information generated by the control related to a game in the second game field.

In other words, the record managing unit 107 manages the first game period and the second game period as one record determining period.

On the other hand, in order to place importance on the matchup game in the second game field, the record managing unit 107 manages the total record information of each player with changing the weighting between the first record related information and the second record related information, so that the weighting of the second record related information becomes heavier.

It should be noted that the first record related information and the second record related information are preferably elements indicating the same record, but may be elements indicating different records.

In the case where the first record related information and the second record related information are elements indicating different records, the record managing unit 107 calculates record information with normalization by a predetermined operation and the like.

4.6.2. Record Managing Processing in First Game Period

In the first game period and the second game period, the record managing unit 107 calculates the first record related information at a predetermined timing. The first record related information is, for example: scores, points and experience values acquired in the first game field; acquired amount of game currency; a number and types of acquired items; war records (number of kills and number of defeats) in the matchup with other players or other player characters; a number of occupied bases (military bases and castles) and surface area thereof; or scores, points and rankings calculated based on these records. Then the record managing unit 107 stores these calculated records, scores, and the like in the player information as the first record related information.

4.6.3. Record Managing Processing in Second Game Period

In the first game period and the second game period, the record managing unit 107 calculates the second record related information at a predetermined timing. Just like the first record related information, the second record related information is, for example: scores, points and experience values acquired in the first game field; acquired amount of game currency; a number and types of acquired items; war records (number of kills and number of defeats) in the matchup with other players or other player characters; a number of occupied bases (military bases and castles) and surface areas thereof; or scores, points and rankings calculated based on these records. Then the record managing unit 107 stores these calculated records, scores and the like in the player information as the second record related information.

Then the record managing unit 107 totals the first record related information and the second record related information managed like this based on the weighting at a predetermined timing in the first game period and the second game period, and thereby calculates the total record information in the matchup game of each player. The record managing unit 107 stores the calculated total record information in the player information.

The predetermined timing includes, for example, a predetermined periodic timing (including timings that are repeatedly set, such as every 5 minutes), an irregular timing that occurs during the course of the game, and a timing instructed by the player.

4.6.4. Team Record Managing Processing

The record managing unit 107 manages the record of each player described above, along with the record information which indicates the record of each team (hereafter referred to as "team record information") in each game period and/or each season.

In particular, in order to invigorate the fluidity of players and promote a heated competition among teams, the record managing unit 107 presents the team record information to each player (specifically, via a concerned terminal 20), or presents the information used as an index to change the affiliated team to the player.

Specifically, in the first game period and the second game period, the record managing unit 107 calculates, for each team, the first record related information, the second record related information, and the total record information of the team, based on the first record related information, the second record related information, and the total information of each player belonging to each team, which were calculated as described above, and stores the various calculated information in the team information.

4.6.5. Record Managing Processing at End of Season

When a predetermined timing comes during the second game period and one season ends by the end of the second game period, as described above, the record managing unit 107 determines the final ranking of each player and each team in the record, based on the total record information of each player and the total record information of each team stored. Then the record managing unit 107 executes predetermined processing, such as paying a reward based on the determined ranking.

It should be noted that the record managing unit 107 may determine the final records of each player and each team for each game period at this time, and execute predetermined processing, such as paying a reward based on the determined final records.

4.7. Other

Next, the team item acquisition control processing executed by the server 10 and other examples of an advantageous effect in the game will be described.

4.7.1. Team Item Acquisition Control Processing 1 Based on Team Attribute Information The item acquisition control unit 106 may execute the team item acquisition control processing to acquire only a team item that can be acquired in accordance with the attribute of the team.

In this case, the team attribute information related to the attribute is stored in the team information of the player information storage unit 146 for each team. Then for each team item, the item managing unit 108 manages acquisition attribute possibility information, which indicates the possibility of the acquisition of an available team item (specifically, information that indicates that this team item cannot be acquired), based on the team attribute stored in the game data storage unit 144.

For a team which was determined, in the acquisition condition determining processing, that the team acquisition condition to acquire a team item is satisfied, the item acquisition control unit 106 determines whether acquisition [of this item] is possible based on the team attribute information of this team and the acquisition attribute possibility information included in the team item information of the game data storage unit 144, and allows the team to acquire this team item if it is determined that the acquisition is possible.

Specifically, the team attribute information and the acquisition attribute possibility information include:

(A1) a number of players, such as at most 5 (small scale team) or at least 50 (large scale team);

(A2) type of attribute in the case where all players belonging to a team have a same attribute, or in the case where at least a predetermined ratio (80%, for example) of the players belonging to the team have the same attribute;

(A3) attribute, which is set by a team, such as an attribute determined by the selection instructed by a player;

(A4) attribute which is determined by a specific item acquired by a team (an item which a specific player of the team acquired during the game, such as a flag, a sword, or the like of the team); and (A5) a combination of at least two of (A1) to (A4).

In other words, even if it is determined that a team ABC (5 players, team level 3, and attribute "fire") satisfies the team item acquisition condition for the team item A (at least 3 players and at least team level 3) in the acquisition condition determining processing, the item acquisition control unit 106 performs control to not allow acquisition of the team item A if the information to disable the acquisition of a team item of which attribute is other than "water" is specified in the acquisition attribute possibility information of the team item A.

4.7.2. Team Item Acquisition Control Processing 2 Based on Team Attribute Information The item acquisition control unit 106 may execute the team item acquisition control processing with changing the team item acquisition condition specified for each item in accordance with the attribute of the team, in order to adjust the balance in acquiring team items based on the team attribute.

In this case, just like the above-mentioned team item acquisition control processing based on the team attribute information, the team attribute information related to the attribute is stored in the team information of the player information storage unit 146, for each team.

Furthermore, in this case, for each team item and for each team attribute, the item managing unit 108 manages the information on the team item acquisition conditions stored in the game data storage unit 144.

Moreover, in this case, the item acquisition control unit 106 executes, for each team, the team item acquisition control processing according to the following steps:
(B1) reading attribute information of each item;
(B2) specifying the team item acquisition condition of each team item corresponding to the attribute information that was read;
(B3) executing the acquisition condition determining processing to determine whether the specified team item acquisition condition is satisfied or not, for each team item which has not yet been acquired by other teams; and
(B4) controlling acquisition of this team item for the team w which was determined that the specified team item acquisition condition is satisfied in the acquisition condition determining processing For example, in the case of the team item A, for a team having the attribute of the large scale team of which number of players belonging to the team is at least 50, the team item acquisition condition that is used is that the team level is at least 5. And for a team having the attribute of the small scale team of which number of players belonging to the team is at most 5, the team item acquisition condition that is used is that the team level is at least 2.

If the team item acquisition condition is changed in accordance with the type of the team item and in accordance with the team attribute like this, a team item that is easy to acquire or a team item that is difficult to acquire can be set in accordance with the team attribute, therefore a strategy to acquire this team item can be incorporated into the game.

4.7.3. Team Item Acquisition Control Processing Based on Ranking of Team

The item acquisition control unit 106 may:
(C1) provide a right to acquire a team item (hereafter referred to as "team item acquisition right") to a plurality of teams, which were determined that the team item acquisition condition is satisfied in the acquisition condition determining processing;
(C2) determine ranking to acquire the team item among the teams having the right to acquire the team item, based on the attribute of each team or the game element when each team satisfied the team item acquisition condition; and
(C3) control acquirement of a desired team item from a plurality of team items, in accordance with the selection instructed by each team, based on the determined ranking.

In particular, in this case, the item acquisition control unit 106 sets at least one team item acquisition condition, executes the acquisition condition determining processing in each team respectively, based on this team item condition that is set, and selects a team that satisfies the condition.

Moreover, in this case, the item acquisition control unit 106 determines the ranking among the teams having the team item acquisition right, in accordance with the sequence of [the teams] satisfying the team item condition as the game element. The item acquisition control unit 106 controls acquirement of the desired team items which have not yet been acquired from the higher ranking in sequence based on the will of the team (for example, based on a selection instructed by the leader).

In this embodiment, besides the ranking in satisfying the team item acquisition condition, the game elements include: a timing when the condition was satisfied (for example, ranking is higher as the deviation from a predetermined timing is less), a degree of difficulty (for example, ranking is higher as the degree of difficult is higher) in the case where this condition is constituted of a plurality of conditions, and a number of conditions that are satisfied (ranking is higher as the number of conditions is higher).

4.7.4. Change of Effect Based on Team Item Acquisition Timing

The game managing unit 103 may manage, for each team, the acquisition timing when the team item is acquired, and change the advantageous effect in the game provided to the team which acquired the team item, depending on the acquisition timing of this team item.

In other words, the game managing unit 103 may change the effect in the game, depending on the acquisition timing of the game item, such as the advantageous effect in the game is higher as the acquisition timing of the team item is closer to the game end timing.

4.7.5. Change of Effect Based on Team Attribute

When an advantageous effect in the game is provided to a team which acquired a team item, the game managing unit 103 may provide the advantageous effect in the game that changes in accordance with the team attribute information of the team, such as, a more advantageous effect is provided to a large scale team than to a small scale team, or a more advantageous effect is provided when the team item has the same attribute as the team attribute than when the team item has an attribute that is different from the team attribute.

In this case, effect information which is different depending on the attribute is stored in each team item information that is stored in the game data storage unit 144. When a team item is acquired, the item managing unit 108 registers, as team item information, this effect information in the corresponding player information.

In this case, when an advantageous effect in the game is provided, the game managing unit 103 specifies an attribute of the team which acquired the team item, and retrieves the effect information specified in the player information based on this specified team attribute, and provides the effect indicated in the corresponding effect information to this team.

4.8. Modifications

Next, modifications of the present embodiment of the invention will be described.

4.8.1. Modification 1: Continuing Matchup Game in Plurality of Seasons

In the case of ending one season (one record determining period) by ending the second game period, the game managing unit 103 may allow the user to use the information on the matchup game in at least one of the first game field and the second game field, as the given information for the next season (that is, the next record determining period that starts after the second game period).

Specifically, the game managing unit 103 may allow the user to continue using the information on a number and type of acquired items, information on the type, ability and characteristic of each player character, records, such as rankings, in the first game period, the second game period and the record determining period, or information related to the above information, as the player information in the next season. Furthermore, the game managing unit 103 may provide a given effect in the next season, such as the acquisition of an advantageous item (including game currency), a selection right within a given game, and a right to execute a loot box, based on the information that indicates that [this player] owned a benefit or was a specific player [in the previous season], for example.

4.8.2. Modification 2: Managing Each Season

The game managing unit 103 manages one season (one record determining period) as a period of determining a champion player or a period of determining the ranking among a plurality of players, but may manage one season as a period having a predetermined length (2 months, for example), or a period determined by a timing which is determined in accordance with the progress state of the game, or a period determined by a number of turns.

4.8.3. Modification 3: Changing Privilege to be Provided

In order to increase playability even for the timing to satisfy the condition to provide the benefit, the item acquisition control unit 106 may provide a benefit that changes depending on the timing when the specific player satisfies the condition. For example, the item acquisition control unit 106 may provide a more advantageous benefit as the timing when the condition is satisfied is sooner.

In this case, for the benefit that changes [depending on the timing], the item acquisition control unit 106 provides, for example, an item having a different ability (attack method, moving method, physical power value, alertness, or the like), or an item of which effect acquired thereby (attack force, defense force, winning probability, or moving speed) is different.

4.8.4. Modification 4: Processing by Terminal

The terminal 20 is configured to:
(A1) receive an instruction from a player;
(A2) send the received instruction from the player to the server 10, and receive the game information related to the matchup game [from the server 10]; and
(A3) display the image related to the game on the display 290 based on the received game information.

Specifically, the input reception processing unit 214 receives instructions, such as setting of a headquarters and input of a comment, from a player, as described above.

Then the communication control unit 210 sends information, including the instructions from the player received by the input reception processing unit 214, to the server 10.

On the other hand, the display control unit 213 displays an image related to the selected matchup game on the display 290 via the communication control unit 210.

5. Operations (Team Item Acquisition Control Processing, Including Acquisition Condition Determining Processing)

Next, operations of the team item acquisition control processing, including the acquisition condition determining processing executed by the server 10, will be described with reference to FIG. 10.

Figure 10:
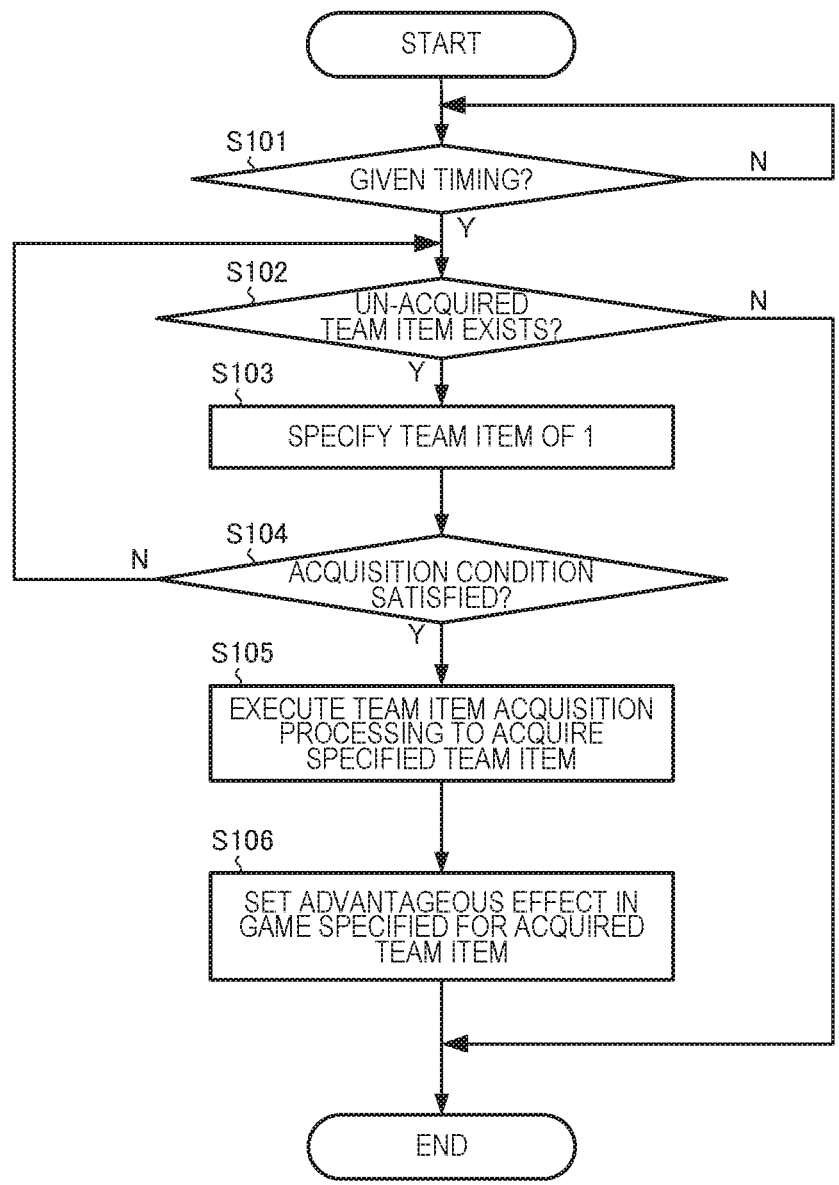
FIG. 10 is a flow chart illustrating operations of team item acquisition control processing including acquisition condition determining processing which is executed by a server according to an embodiment of the invention.

It should be noted that FIG. 10 is a flow chart illustrating operations of the game control processing which is executed by the server 10 in one season.

It is assumed that the present operations are executed at a predetermined timing for each team participating in the game, and that the player information of each player participating in this game has already been stored in the player information storage unit 146.

First, when the predetermined timing (for example, timing at every 3 minutes from start of game) is detected (step S101), the item acquisition control unit 106 determines whether there is a team item which has not yet been acquired by other teams (step S102).

At this point, the item acquisition control unit 106 ends this operation when it is determined that there is no team item which has not yet been acquired by other teams, or operation transits to the processing in step S103 when it is determined that there is a team item which has not yet been acquired by other teams.

Next, when it is determined that there are team items which have not yet been acquired by other teams, the item acquisition control unit 106 specifies one team item, out of the team items which have not yet been acquired by other teams, according to a predetermined algorithm (step S103).

It should be noted that in this case, the item acquisition control unit 106 satisfies one team item which has not yet been acquired by other teams in accordance with: the sequence of IDs assigned to the team item; the characteristic of the team item (level or the like); or an algorithm (random or the like).

Next, the item acquisition control unit 106 specifies the team item acquisition condition of the specified team item, and determines whether this team satisfies the specified team item acquisition condition (step S104).

At this point, the item acquisition control unit 106 transits to the processing in step S105 when it is determined that this team does not satisfy the specified team item acquisition condition, or to the processing in step S102 when it is determined that this team satisfies the specified team item acquisition condition.

Next, when it is determined that [the team] satisfies the specified team item acquisition condition, the item acquisition control unit 106 executes the team item acquisition control processing based on the information on the specified team item (step S105).

It should be noted that as the team item acquisition control processing, the item acquisition control unit 106 reads various information on this team item stored in the game data storage unit 144, and registers this information in the team information on this team in the player information storage unit 146.

Next, the item acquisition control unit 106 sets the advantageous effect in the game specified for the acquired team item for this team, as an effect that [this team] can use (step S106), and ends this operation.

6. Other

The invention is not limited to the embodiments described above, and various modifications can be made thereto. For example, any term cited with another term having a broader meaning than or the same meaning as the term in the description or the drawings may be replaced by the other term having a broader meaning than or the same meaning as the term anywhere in the description or the drawings.

While the matchup game constituted by the domestic affairs game (city building game) and the battle game executed by simulation was described above in the above embodiments, the present invention can also be applied to various types of games, such as: sports matchup games including baseball games, soccer matches and basketball games; role playing games; and other operation action games.

Furthermore, in the embodiments of the invention, one server 10 may provide each game to the terminals 20, or may construct a server by linking a plurality of servers 10, and provide each game to the terminals 20 using this server.

In addition, in the embodiments described above, the terminal 20 executes the game processing based on the game control information provided by the server 10, but the game may be realized by the server 10 executing each function and game program of the processing unit 200 of the terminal 20, and the terminal 20 executing the image display based on the operation input and streaming.

In this case, as the game control information, the server 10 provides the information related to the display of the game image to the terminal 20.

The invention includes configurations that are substantially the same (for example, a same configuration in terms of the functions, methods and results, or a same configuration in terms of objectives and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but an individual skilled in the art will readily understand that various modifications can be made from the embodiments without substantially departing from the novel teachings and effects of the invention. Accordingly, all such modifications are assumed to be included in the scope of the invention.

What is claimed is:

1. A game system which executes a game into which one or more teams having at least one player entry and that controls a plurality of player characters in at least one of the teams, each of the player characters being operated by a respective player, the game system comprising a processor programmed to:

execute control related to the game for each of the teams;

manage a game item which is acquired by each of the teams in the game and provides an advantageous effect in the game to a team which has acquired the game item, acquisition number of the game item being limited based on a number of the teams competing to acquire the game item;

execute, for each of the teams, determining processing to determine whether a given first condition is satisfied during the game;

control acquirement of the game item for a team that is determined to satisfy the first condition in the determining processing;

manage an acquisition timing of the game item acquired for the team; and decide a content of the advantageous effect of the team in the game in accordance with the acquisition timing of the game item; and after the team acquires the game item, provide the advantageous effect for which the content is decided to each player belonging to the team, or to each player character operated by each player belonging to the team.

2. The game system according to claim 1, wherein the processor is programmed to, execute determining processing to determine a team to which each of the at least one player belongs, and changing processing to change the team of the player to which team has already been belonged.

3. The game system according to claim 1, wherein the game item defines a leader character who functions as a leader in the game, and the processor is programmed to, as the advantageous effect in the game, change a parameter of the player, the parameter being related to an ability that is set for the leader character of the team, the parameter belonging to the team that acquires the leader character, or in which a player character of the player.

4. The game system according to claim 1, wherein the processor is programmed to, when the game has a given game period and is for competing a record among the teams, manage record information which indicates the record of each of the teams.

5. The game system according to claim 1, wherein the processor is programmed to, execute the determining processing to determine whether a game element satisfies the first condition, the game element being related to growth of each of the teams during the game or growth of each of the at least one player belonging to each of the teams during the game.

6. The game system according to claim 1, wherein the processor is programmed to:

manage the game item in each of which the first condition is specified; and execute the determining processing to determine whether the first condition specified in each of the game items is satisfied.

7. The game system according to claim 1, wherein the processor is programmed to,
when the team which has acquired the game item holds the game item until an end point of the game, provide a given benefit to the team.

8. The game system according to claim 1, wherein team attribute information related to an attribute of each of the teams is stored in a storage, and
the processor is programmed to:
manage, individually for the game item, acquisition possibility information to indicate whether acquisition of the game item is possible based on each of the team attribute information; and
execute the acquirement of the game item for the team that is determined to satisfy the first condition in the determining processing, the game item including the acquisition possibility information that indicates that acquirement of the team attribute information of the team is possible.

9. The game system according to claim 1, wherein team attribute information related to an attribute of each of the teams is stored in a storage, and
the processor is programmed to
change the first condition in accordance with the attribute indicated by the team attribute information.

10. The game system according to claim 1, wherein team attribute information related to an attribute of each of the teams is stored in a storage, and
the processor is programmed to,
when the advantageous effect in the game is provided to the team that has acquired the game item, provide the advantageous effect that changes in accordance with the team attribute information of the team, in the game.

11. The game system according to claim 1, wherein the processor is programmed to,
when a first team that has already acquired the game item and a second team that is different from the first team execute the game having a matchup element, execute transfer control processing to transfer the game item owned by the first team to the second team in a case where the second team wins a matchup.

12. The game system according to claim 1, wherein the processor is programmed to;
execute determining processing to determine whether a player who has not yet acquired the game item satisfies a given second condition that is set to be more disadvantageous in the game than the first condition; and
provide a given benefit to the player when it is determined that the second condition is satisfied in the determining processing.

13. The game system according to claim 1, wherein the processor is programmed to:
provide rights to acquire game item to a plurality of teams that are determined that the first condition is satisfied in the determining processing; and
determine an order to acquire the game item among the plurality of teams having the rights to acquire the game item, in accordance with an attribute of each of the teams or a game element when each of the teams satisfies the first condition; and
execute the acquirement of the game item for the team that is determined to satisfy the first condition in the determining processing, based on the determined order to acquire the game item in accordance with a selection instruction of each of the teams.

14. A server which causes a terminal that is connected via a network and is operated by a player, to execute a game into which one or more teams having at least one player entry and that controls a plurality of player characters in at least one of the teams, each of the player characters being operated by a respective player, the server comprising a processor programmed to:
receive an operation instruction from the player;
execute control related to the game for each of the teams;
manage a game item which is acquired by each of the teams in the game and provides an advantageous effect in the game to a team which has acquired the game item, acquisition number of the game item being limited based on a number of the teams competing to acquire the game item;
execute, for each of the teams, determining processing to determine whether a given first condition is satisfied during the game;
control acquirement of the game item for a team that is determined to satisfy the first condition in the determining processing;
manage an acquisition timing of the game item acquired for the team; and
decide a content of the advantageous effect of the team in the game in accordance with the acquisition timing of the game item;
after the team acquires the game item, provide an advantageous effect for which the content is decided to each player belonging to the team, or to each player character operated by each player belonging to the team; and
provide game control information on the game, including information related to the acquired game item and the advantageous effect, to the terminal.

15. A terminal which is connected to the server according to claim 14 via a network, the terminal comprising a processor programmed to:
receive an instruction from the player;
transmit the received instruction from the player to the server, and receive game information related to the game; and
display an image related to the game on a display unit based on the received game information.

16. The server according to claim 14, wherein the processor is programmed to,
execute determining processing to determine a team to which each of the at least one player belongs, and changing processing to change the team of the player to which team has already been belonged.

17. The server according to claim 14, wherein the game item defines a leader character who functions as a leader in the game, and
the processor is programmed to,
as the advantageous effect in the game, change a parameter of the player, the parameter being related to an ability that is set for the leader character of the team, the parameter belonging to the team that acquires the leader character, or in which a player character of the player.

18. A game control method for executing a game into which one or more teams having at least one player entry and that controls a plurality of player characters in at least one of the teams, each of the player characters being operated by a respective player, the game control method comprising:

executing control related to the game for each of the teams;

managing a game item which is acquired by each of the teams in the game and provides an advantageous effect in the game to a team which has acquired the game item, acquisition number of the game item being limited based on a number of the teams competing to acquire the game item;

executing, for each of the teams, determining processing to determine whether a given first condition is satisfied during the game;

controlling acquirement of the game item for a team that is determined to satisfy the first condition in the determining processing;

managing an acquisition timing of the game item acquired for the team; and deciding a content of the advantageous effect of the team in the game in accordance with the acquisition timing of the game item;

after the team acquires the game item, providing the advantageous effect for which the content is decided to each player belonging to the team, or to each player character operated by each player belonging to the team.

19. The game control method according to claim 18, further comprising determining a team to which each of the at least one player belongs, and changing the team of the player to which team has already been belonged.

\* \* \* \* \*